(12) United States Patent
Baramov

(10) Patent No.: US 9,704,116 B2
(45) Date of Patent: Jul. 11, 2017

(54) MANUFACTURING OPTIMIZER BASED ON PRODUCTION AND CONSUMPTION TARGETS

(71) Applicant: Honeywell International Inc., Morristown, NJ (US)

(72) Inventor: Lubomir Baramov, Prague (CZ)

(73) Assignee: Honeywell International Inc., Morris Plains, NJ (US)

(*) Notice: Subject to any disclaimer, the term of this patent is extended or adjusted under 35 U.S.C. 154(b) by 1103 days.

(21) Appl. No.: 13/848,429

(22) Filed: Mar. 21, 2013

(65) Prior Publication Data

US 2013/0297367 A1   Nov. 7, 2013

(30) Foreign Application Priority Data

Mar. 21, 2012   (EP) ..................................... 12160648

(51) Int. Cl.
*G06Q 10/06*   (2012.01)
(52) U.S. Cl.
CPC .............................. *G06Q 10/06312* (2013.01)
(58) Field of Classification Search
CPC ............................................... G06Q 10/06312
See application file for complete search history.

(56) References Cited

U.S. PATENT DOCUMENTS 7,310,572 B2    12/2007   Havlena et al.
2011/0231028 A1*   9/2011   Ozog ..................... G06Q 10/06
                                                        700/291

OTHER PUBLICATIONS

Susara A. van den Heever and Ignacio E. Grossmann, A strategy for the integration of production planning and reactive scheduling in the optimization of a hydrogen supply network, Dec. 15, 2003, Computers & Chemical Engineering, vol. 27, Issue 12, pp. 1813-1839.*
"European Application Serial No. 121606487, Extended EP Search Report of Sep. 7, 2012", 3 pgs.

* cited by examiner

*Primary Examiner* — Thomas Mansfield
*Assistant Examiner* — Amanda Gurski
(74) *Attorney, Agent, or Firm* — Schwegman Lundberg & Woessner, P.A.

(57) ABSTRACT

An optimizer is used to help manage a process that has multiple consumption inputs with differing costs, multiple production outputs with differing sale prices and intermediates. The process may have storage capabilities for some consumption inputs, production outputs and intermediates. Further, there may be multiple production and consumption targets for the total amount of consumption inputs/production outputs, consumed/produced over a fixed period of time. The optimizer finds the most economical solution while staying in a region from which the contract target is reachable for any combination of uncertain fixed trajectories from pre-selected intervals.

20 Claims, 15 Drawing Sheets

| VARIABLE | DESCRIPTION | COST |
|---|---|---|
| SOURCES | | |
| $S_1$ | HIGH-GRADE FUEL WITH PERIODIC CONTRACT | $C_{s1}$ |
| $S_2$ | LOW-GRADE/LOW PRICE FUEL, NO STORAGE | $C_{s2}$ |
| INTERMEDIATES | | |
| $I_1$ | HIGH-GRADE FUEL TO BE BURNED IMMEDIATELY | 0 |
| $I_2$ | HIGH-GRADE FUEL TO BE STORED | $C_{I2}$ |
| $I_3$ | HIGH-GRADE FUEL RETRIEVED FROM STORAGE | $C_{I3}$ |
| $I_4$ | LOW-GRADE FUEL TO BE BURNED IMMEDIATELY | 0 |
| PRODUCTS | | |
| $P_1$ | PROCESS STEAM - SITE CONSUMPTION | 0 |
| $P_2$ | ELECTRICITY SUPPLY TO THE GRID, SUBJ TO PERIODIC CONTRACTS | $C_{P2}$ |
| $P_3$ | ELECTRICITY - SITE CONSUMPTION | |

*FIG. 2*

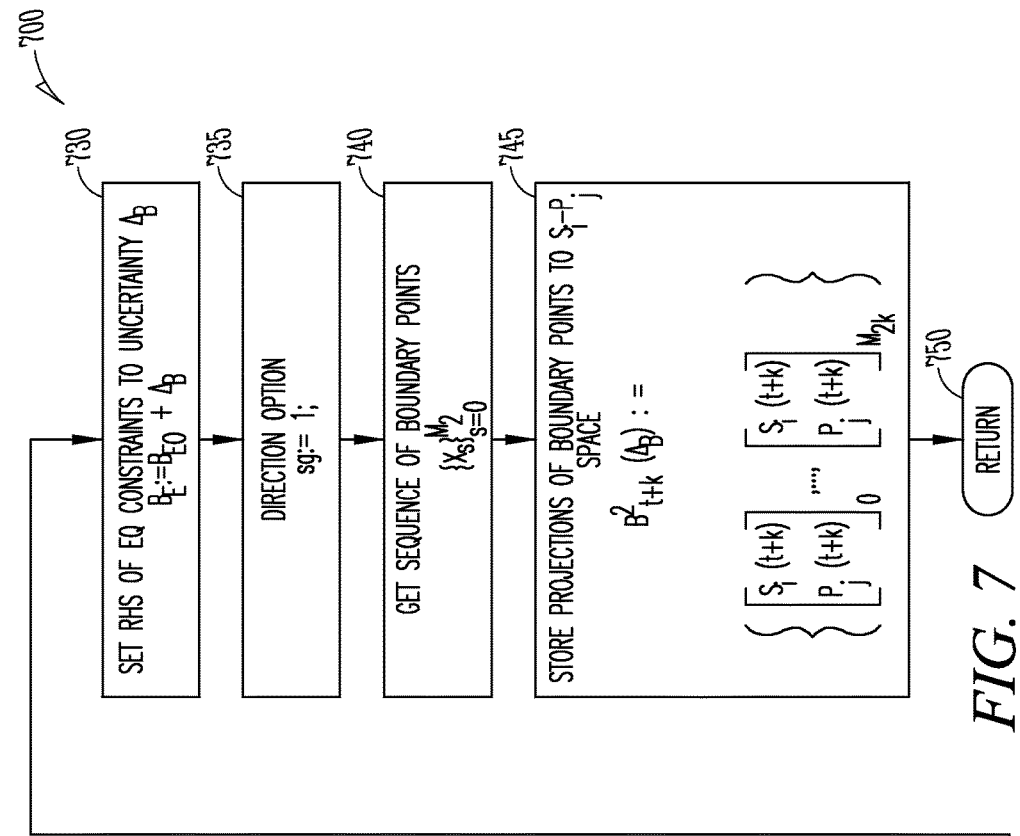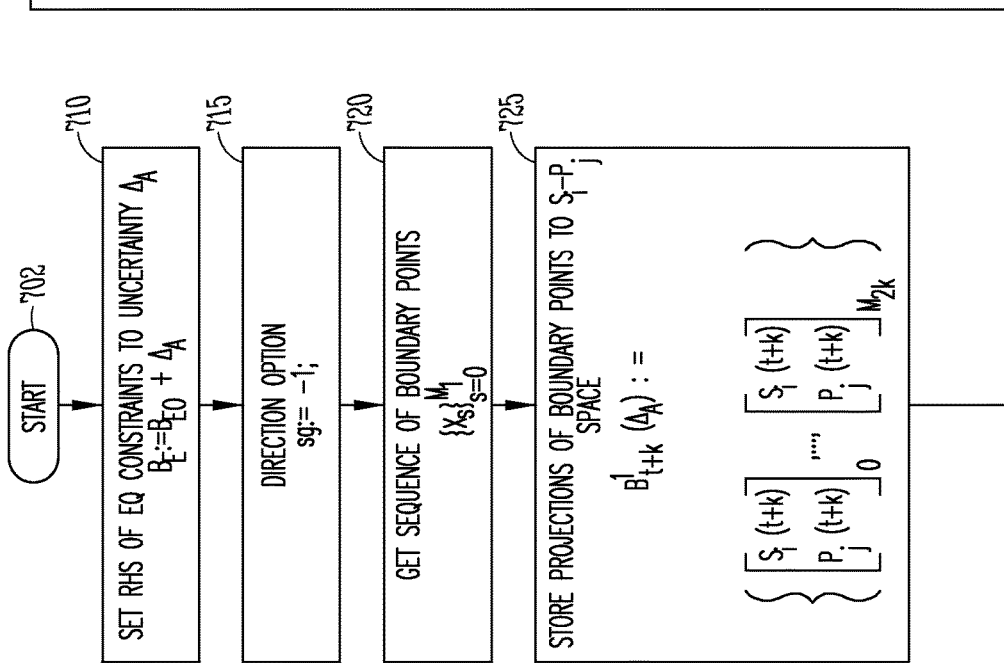
FIG. 7

MANUFACTURING OPTIMIZER BASED ON PRODUCTION AND CONSUMPTION TARGETS

BACKGROUND

Optimization of a process involving transformation of multiple source media streams into product streams can be very difficult. The media flows proceed continuously in time and are subject to various constraints. Some of the flows are fixed at all times—these are either sources of raw materials that need to be processed with no storage available, or products, whose demands must be satisfied. Some flows are not limited to specific values at each time; instead, total amount of a source consumed, or a product generated for a fixed period of time is set by a contract to a specific target. A deviation from the contracted targets is usually heavily penalized. Some products/source flows are restricted only within certain interval limits. Some flows (products, sources or intermediates) can be stored, usually at additional costs, thus increasing the number of degrees of freedom. The goal is to operate the plant in the most economical way, which typically involves choosing a feasible mixture of products/sources resulting in contract fulfillment and the largest difference between products sales and raw material costs. Due to the presence of periodic contracts and storages, this optimization problem is a dynamic one and has to be solved on a (sufficiently long) time horizon. The main challenge comes from the fact that fulfillment of the contracts in the future influences the present decisions; these decisions are highly sensitive to estimated future trajectories of the fixed source and product streams that are inherently uncertain.

SUMMARY

An optimizer is used to help manage a process that has multiple consumption inputs with differing costs, multiple production outputs with differing sale prices and intermediates. The process may have storage capabilities for some consumption inputs, production outputs and intermediates. Further, there may be multiple production and consumption targets for the total amount of consumption inputs/production outputs, consumed/produced over a fixed period of time. The optimizer finds the most economical solution while staying in a region from which the contract target is reachable for any combination of uncertain fixed trajectories from pre-selected intervals.

BRIEF DESCRIPTION OF THE DRAWINGS

FIG. 2 is a table of variables used to represent sources, intermediates, and products according to an example embodiment.

FIG. 7 is a flow chart representation of a method of computing feasibility bounds according to an example embodiment.

DETAILED DESCRIPTION

Figure 1:
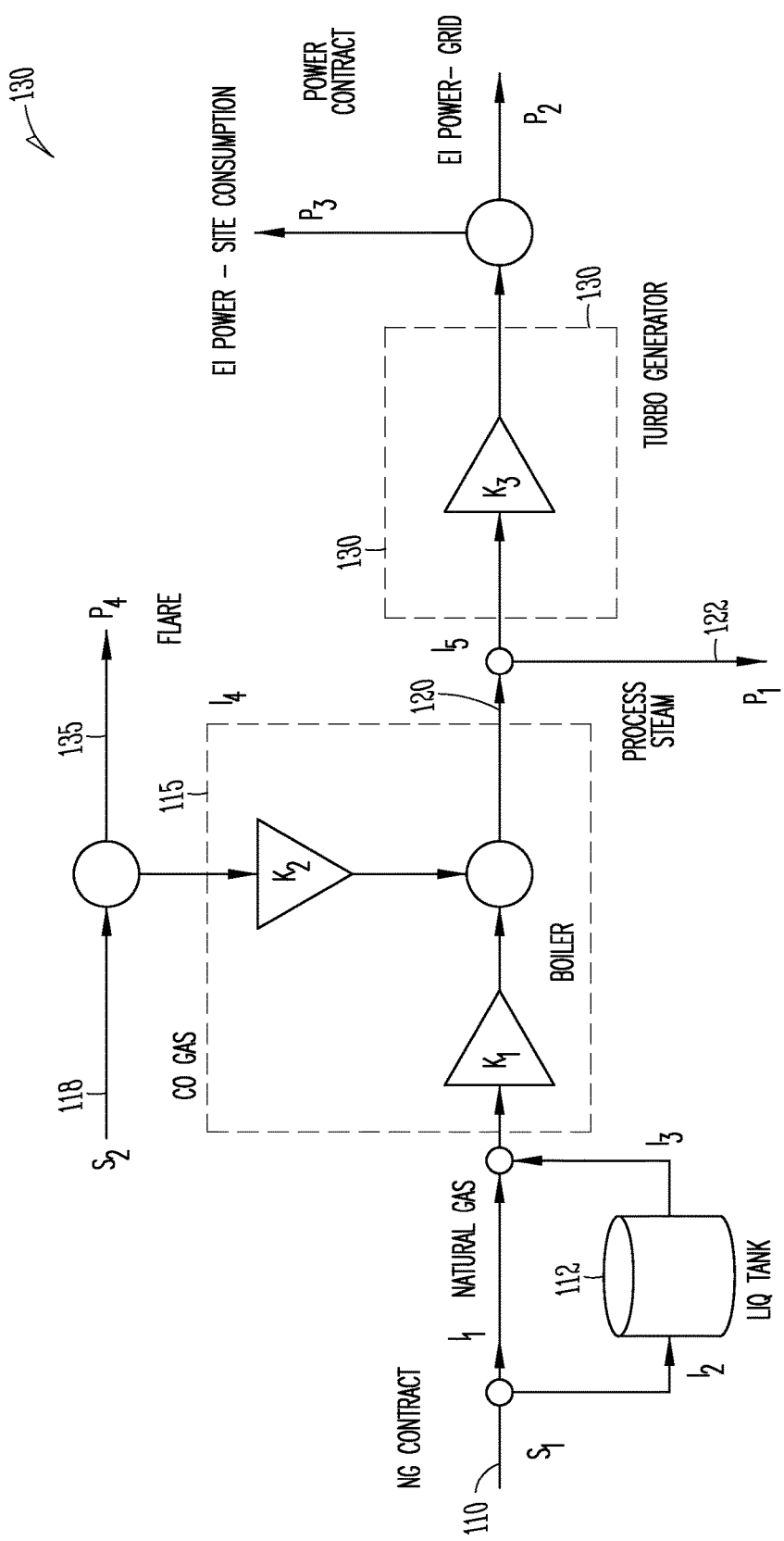
FIG. 1 is a block diagram of a sample system for use in producing power which is used to illustrate one example optimizer embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on computer readable storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

An optimizer is used to help manage a process that has multiple consumption inputs with differing costs, multiple production outputs with differing sale prices and intermediates. The process may have storage capabilities for some consumption inputs, production outputs and intermediates. Further, there may be multiple production and consumption targets for the total amount of consumption inputs/production outputs, consumed/produced over a fixed period of time. These targets are typically negotiated and contracted with external distribution network operators and not fulfillment is heavily penalized. Some of the consumption inputs and production outputs may also be constrained to prescribed values in order to meet specific requirements. Other consumption inputs and production outputs may vary freely within specific bounds, and so can the intermediates. The decision on the current values of variables that can be freely changed depends on reachability of the contracted targets in the future, availability of storage capacities and expected future values of constrained inputs and outputs. The optimizer finds the most economical solution while staying in a region from which the contract target is reachable for any combination of uncertain fixed trajectories from pre-selected intervals.

One example process is used for example purposes only. Many other processes may also be optimized using the algorithms described herein. The optimizer provides an output that may then be used by a process controller to control flows consistent with the most economical solution. In various embodiments, the process may be controlled to switch between consumption inputs, store some inputs and to modify flow of intermediates and product flows.

FIG. 1 is a block diagram of a sample system 100 for use in producing power which can be used to illustrate one example embodiment. There are two source materials. A first source for input into the process is represented by source $S_1$ at 110, and corresponds to natural gas which is subject to periodic contracts and has cost of $c_{s1}$. A portion of $S_1$ may be stored in a tank 112, while the rest is provided to a boiler 115 as needed. The portion directly provided to boiler 115, it is identified as intermediate $I_1$. The portion provided to the tank 112, it is identified as intermediate $I_2$, with a cost of $c_{l2}$; this is essentially the cost associated with liquefaction of the gas. Gas provided from the tank 112 to the boiler 115, is identified as intermediate $I_3$, with associated cost $c_{l3}$, which may be the retrieval cost. Source $S_2$ at 118 corresponds to a low grade and low cost fuel such as CO gas (or any refinery by-product or waste) that cannot be stored and/or sold. It has a cost of $c_{s2}$, considerably lower than $c_{s1}$. A portion of this fuel is also provided to boiler 115 and is identified as intermediate L. The remaining portion of the low-grade fuel denoted as $P_4$ is that burned in the flare 135, i.e., wasted. This is labeled as 'product', but has no value and is naturally minimized by the optimizer. It is nonzero only if the inflow of $S_2$ is larger than the boiler can process.

Boiler 115 produces steam at 120. Either fuel may be used, but each has different costs and may be subject to different supply chains and contracts. In addition, respective transformation factors $K_1$ and $K_2$ identify gains in the transformation of the fuel to steam. Some of the steam indicated at 122, and represented by product $P_1$, may be provided to be used in heating, or other ancillary process on or near the system site. The remainder of the steam may be provided as intermediate $I_5$ to a generator 130. Generator 130 produces electrical power with a transformation factor of $K_3$, which is provided to an electrical grid as product $P_2$, with a corresponding cost of $C_{P2}$, or may also be consumed on site as indicated by product $P_3$. Power supplied to the grid may also be subject to periodic contracts with an electrical utility company controlling a portion of the grid.

FIG. 2 is a table 200 of the variables 205 used to represent the sources 210, intermediates 215, and products 220 with further description 225 of the corresponding uses and ways to obtain and consume them, along with costs 230. Products, as $P_2$ have nonpositive cost, opposite value to their unit selling price. Products which are fixed by external demands have no price tag, although they are valuable—their value is not relevant for the optimization problem. Variables can be expressed either in mass/volume/energy flows; however, in one embodiment, the variables are transformed into heat flow units, to keep the problem well scaled. Transformation variables $K_1, \ldots, K_3$ are then unitless efficiencies.

Variables subject to optimization are intermediates and flows of material/product media that are not prescribed by external demands/supplies.

$$x = [S_1^T I_1^T \ldots I_5^T P_2^T P_4^T]^T,$$

where superscript T denotes the transposition. The nominal optimization problem is to minimize the following cost function $$J(X(t+1), \ldots, X(t+N)) = p_{S1}\left|V_{S1}(t) + T_s\sum_{k=1}^{K_{S1}} S_1(t+k) - S_{1tgt}\right| + \quad (1.1)$$

$$p_{P2}\left|V_{P2}(t) + T_s\sum_{k=1}^{K_{P2}} P_2(t+k) - P_{2tgt}\right| +$$

$$\sum_{k=1}^{N}\sum_{i=\{1,2\}} c_{si}(t+k)S_i(t+k) + \sum_{j=\{2,3\}} c_{Ij}(t+k)I_j(t+k) +$$

$$c_T(k+j)T_s(I_2(t+k) - I_3(t+k)) - c_{P2}P_2(t+k)$$

$T_S$ denotes the sampling interval, N the optimization horizon, time instant $t+K_{S1}$ and $t+K_{p2}$ are ends of the contracting periods for high-grade fuel and electricity, respectively; $p_{S1}$, $p_{p2}$ are penalties for not fulfilling the respective contracts; variable $V_{s1}(t)$ ($V_{p2}(t)$) denote high-grade fuel amount taken (electrical energy supplied) from the beginning of the respective contracting period to time t; there holds $V_{S1}(t+1)=V_{S1}(t)+T_sS_1(t)$ and $V_{P2}(t+1)=V_{P2}(t)+T_sP_2(t)$. In practice, the horizon may span over several contracting periods. Including additional penalty terms associated with these periods is straightforward.

Costs $c_{I2}$ and $c_{I3}$ denote the costs associated with storing (e.g., liquefaction) and retrieval (e.g., vaporization) of the high-grade fuel. Finally, $c_T$ denotes the cost of storing a volume unit of the high-grade fuel.

The involved variables are restricted by the following set of balance equations that have to be satisfied at any time instant t (the time argument being omitted):

$$S_1 - I_1 - I_2 = 0$$

$$I_4 + P_4 = S_2$$

$$K_1(I_1 + I_3) + K_2 I_4 - I_5 = P_1$$

$$-P_2 + K_3 I_5 = P_3 \quad (1.2)$$

These equations can be written in the condensed form as $$A_E\tilde{X} = B_E, \ \tilde{X} = [X(t+1)^T \ldots X(t+N)^T] \quad (1.3)$$

The involved variables are subject to inequality constraints; first, each of the optimized variables may have an upper and lower bound limit, so that (for each t)

$$X_{Lo} \leq X \leq X_{Hi} \quad (1.4)$$

Further, the upper and lower limit on stored fuel volume must be imposed, $$0 \leq T_{S1}(t) + T_s\sum_{j=1}^{k}(I_2(j) - I_3(j)) \leq T_{max} \quad (1.5)$$

Also, for guaranteeing stability of combustion, a minimum high-grade-to-low grade fuel ratio must be guaranteed at all times, i.e., $$-(I_1 + I_3) + R_{min}I_4 \leq 0 \quad (1.6)$$

Inequalities (1.4)-(1.6) are represented in matrix form as $$A\tilde{X} \leq B \quad (1.7)$$

The problem of minimizing cost (1.1) subject to constraints (1.3) and (1.7) can be transformed to a standard linear program. For instance, the penalty term associated with one contract $$J_1(S_1(t+1), \ldots, S_1(t+n)) = p_{S1}\left|V_{S1}(t) + T_s\sum_{k=1}^{K_{S1}} S_1(t+k) - S_{1tgt}\right|$$

is replaced by another one $$\bar{J}_1(z_1,z_2) = p_{S1}(z_1+z_2)$$

for auxiliary variables $z_1$ and $z_2$, satisfying $$z_1 \geq 0, \; z_2 \geq 0,$$

$$z_1 + V_{S1}(t) + T_s\sum_{k=1}^{K_{S1}} S_1(t+k) - S_{1tgt} \geq 0,$$

$$z_2 - V_{S1}(t) - T_s\sum_{k=1}^{K_{S1}} S_1(t+k) + S_{1tgt} \geq 0.$$

This recasts the optimization into a standard linear programming (LP) problem.

Modifications of the problem may be made in further embodiments. For instance, in order to reduce computational complexity while preserving the time horizon length, the so-called blocking is applied, i.e., the media flow variables are allowed to change only at specific time instants; let the set of these instants be denoted as B(t), 1∈B(t). Then, $$X(t+k) = X(t+k-1), \; \forall k \notin B(t). \tag{1.8}$$

Thus, the flows at instants different from the blocking set are no longer subject to optimization. Moreover, the number of constraints on flows is similarly reduced, being limited to the blocking set. The number of constraints on the storage variables (as in (1.5)) is restricted as well; these constraints may be reduced to the set of time instants $$B_S(t) = \{k | k+1 \in B(t)\} \cup \{N\}. \tag{1.9}$$

It may be desirable in some embodiments to penalize squares of increments of individual variables, i.e., $$J_D(X(t+1), \ldots, X(t+N)) = \tag{1.10}$$
$$J(X(t+1), \ldots, X(t+N)) + \sum_{k=1}^{N} \Delta X(t+k)^T W_\Delta(t+k) \Delta X(t+k),$$

where $\Delta X(t+k) = X(t+k) - X(t+k-1)$. Weighting matrix $W_\Delta$ is typically diagonal, with small positive numbers on the diagonal. Hence, the problem becomes that of Quadratic Programming, QP. The additional term should reduce the ill-posedness of LP, i.e., certain ambiguity of the optimum. It thus improves smoothness of the optimal solution without substantially affecting the cost distribution among the media, if the weighting is suitably chosen.

One weakness of this approach is that the right-hand side of balance equalities (1.3) is uncertain. This uncertainty is represented by lower and upper bounds on perturbations on 'fixed' steam flows, i.e., $$S_2 = S_{20} + \delta_{s2}, \; \delta_{S2min} \leq \delta_{S2} \leq \delta_{S2max}$$

$$P_1 = P_{10} + \delta_{P1}, \; \delta_{P1min} \leq \delta_{P1} \leq \delta_{P1max}$$

$$P_3 = P_{10} + \delta_{P3}, \; \delta_{P3min} \leq \delta_{P3} \leq \delta_{P3max} \tag{1.11}$$

Notice that both nominal values (with zeros in subscripts) and perturbation bounds are time-dependent and a priori known. The cost-function is, due to the penalty terms on contracted targets, highly sensitive to the right-hand sides; hence, an additional restriction is needed to keep the process in states from which targets are achievable despite of the uncertainty.

Robust Feasibility Region and its Projection.

Feasibility region for the above problem is given by $$F(B_{E0}) = \{\tilde{X} | A_E\tilde{X} = B_{E0}, A\tilde{X} \leq B\}. \tag{1.12}$$

Robust feasibility region is then $$R_F(B_{E0}, \Delta_{min}, \Delta_{max}) = \{\cap F(B_{E0} + \Delta) | \Delta_{min} \leq \Delta \leq \Delta_{max}\} \tag{1.13}$$

where $\Delta = [0 \; \delta_{S2} \; \delta_{P1} \; \delta_{P3}]^T$. Due to the simple dependency on the uncertainty, we can have the following simplification $$R_F(B_{E0}, \Delta_{min}, \Delta_{max}) = F(B_{E0} + \Delta_A) \cap F(B_{E0} + \Delta_B) \tag{1.14}$$

where $\Delta_A = [0 \; \delta_{S2min} \; \delta_{P1max} \; \delta_{P3max}]^T$ and $\Delta_B = [0 \; \delta_{S2max} \; \delta_{P1min} \; \delta_{P3min}]^T$. In short, one of the uncertainties is given by the upper bounds on uncertainties on product streams and lower bounds on uncertainties on source streams, while the other one is vice versa.

One of the goals of the optimizer is to avoid heavy penalties from failures to fulfill the contract. For this, a projection of this set to flow variables related to the contracts is of particular interest—specifically to the space $$\begin{bmatrix} S_1(t+1) \\ P_2(t+1) \end{bmatrix} \times \ldots \times \begin{bmatrix} S_1(t+N) \\ P_2(t+N) \end{bmatrix}.$$

An Approximation of this projection by the subset will be obtained.

Robust Reachability Set of Contract Variables

Here we shall consider the space of contract variables $$\begin{bmatrix} V_{S1}(t+1) \\ V_{P2}(t+1) \end{bmatrix} \times \ldots \times \begin{bmatrix} V_{S1}(t+N) \\ V_{P2}(t+N) \end{bmatrix}.$$

Further, consider sub-space in that space given by sets $$T(t+1,F) \times \ldots \times T(t+N,F) \tag{1.15}$$

satisfying
1. For the end of contracting period t+K, $$T(t+K, F) = \left\{ \begin{bmatrix} V_{S1tgt} \\ V_{P2tgt} \end{bmatrix} \right\}.$$

2. For any $1 \leq i < K$ and any point $$\begin{bmatrix} V_{S1}(t+i) \\ V_{P2}(t+i) \end{bmatrix} \in T(t+i, F),$$

there exist a flow trajectory $\tilde{X} \in F$ so that $$\begin{bmatrix} V_{S1}(t+k) \\ V_{P2}(t+k) \end{bmatrix} \in T(t+k, F).$$

In other words, the above definition says that the sets T(t+k, F) characterize reachability regions in the space of contract variables for specified consumption/production targets and for given trajectories of fixed media (here $S_2$, $P_1$ and $P_3$).

It was implicitly assumed that the contract periods for all media co-inside and occurs once per optimization horizon. The latter assumption was made for the simplicity of exposition and is straightforward to lift. Robust reachability set is given by $$T(t+k, F(B_{E0}), \Delta) = \bigcap_{\Delta_{min} \leq \Delta \leq \Delta_{max}} T(t+k, F(B_{E0} + \Delta)). \quad (1.16)$$

In particular, we shall assume.

$$T(t+k,F(B_{E0}),\Delta) = T(t+k,F(B_{E0}+\Delta_A)) \cap T(t+k,F(B_{E0}+\Delta_B)). \quad (1.17)$$

The original optimization problem is re-formulated so that its solution is more robust with respect to the uncertainty in future source supply/product demands that have to be satisfied. In fact, high penalties are imposed on the squared distance of contract variable trajectories from certain contract reachability regions. If the trajectories are inside these regions, the cost function is the same as the nominal one. In particular, the robustified cost function is given by $$J_R(X(t+1), \ldots, X(t+N), z_A(k+1), \ldots, z_A(k+N), \quad (1.18)$$
$$z_B(k+1), \ldots, z_B(k+N)) = J(X(t+1), \ldots, X(t+N)) +$$
$$W \sum_{k=1}^{K} \left\| \begin{bmatrix} V_{S1}(t+k) \\ E_{P2}(t+k) \\ V_{S1}(t+k) \\ E_{P2}(t+k) \end{bmatrix} - \begin{bmatrix} z_A(t+k) \\ z_B(t+k) \end{bmatrix} \right\|^2,$$

where $$V_{S1}(t+k) = V_{S1}(t) + T_S \sum_{j=1}^{k} S_1(t+j)$$

and $$V_{P2}(t+k) = V_{P2}(t) + T_S \sum_{j=1}^{k} P_2(t+j).$$

In addition to (1.3)-(1.7), further constraints are imposed for newly introduced auxiliary variables $z_A$ and $z_B$:

$$z_A(t+k) \in T(t+k,F(B_{20}+\Delta_A))$$
$$z_B(t+k) \in T(t+k,F(B_{20}+\Delta_B)). \quad (1.19)$$

Constraints (1.19) are convex polytopic/polygonal regions in the $V_{S_1}(t+k) \times V_{P_2}(t+k)$ plane; hence, they can be represented by a standard set of linear inequalities of the form $$\begin{aligned} A_{CAk} z_A(t+k) &\leq B_{CAk} \\ A_{CBk} z_B(t+k) &\leq B_{CBk} \end{aligned} \bigg\} k = 1, \ldots, K. \quad (1.20)$$

The number of constraints in (1.20) corresponds to the number of edges bounding the regions in (1.19). The optimization problem of robust economic optimization on a fixed horizon with targets and integral constraints is thus that of Quadratic programming (QP), well known from advanced control and real-time optimization. This formulation may resemble the concept of range control (known from, e.g. Profit Controller or MACE of Honeywell. The difference is, that while the range control concept uses box-shaped regions in each time-frame, (1.20) is more general. Further, the region is not operator-defined, but computed from uncertainty bounds. Note also that this formulation is feasible even if the intersection in (1.14) is empty. Then, the solution is the best trade-off for robustness.

What remains is to find the regions in (1.19), or their suitable representations. This will be addressed in the following sections.

Real-Time Operation of the Optimizer

Figure 3A:
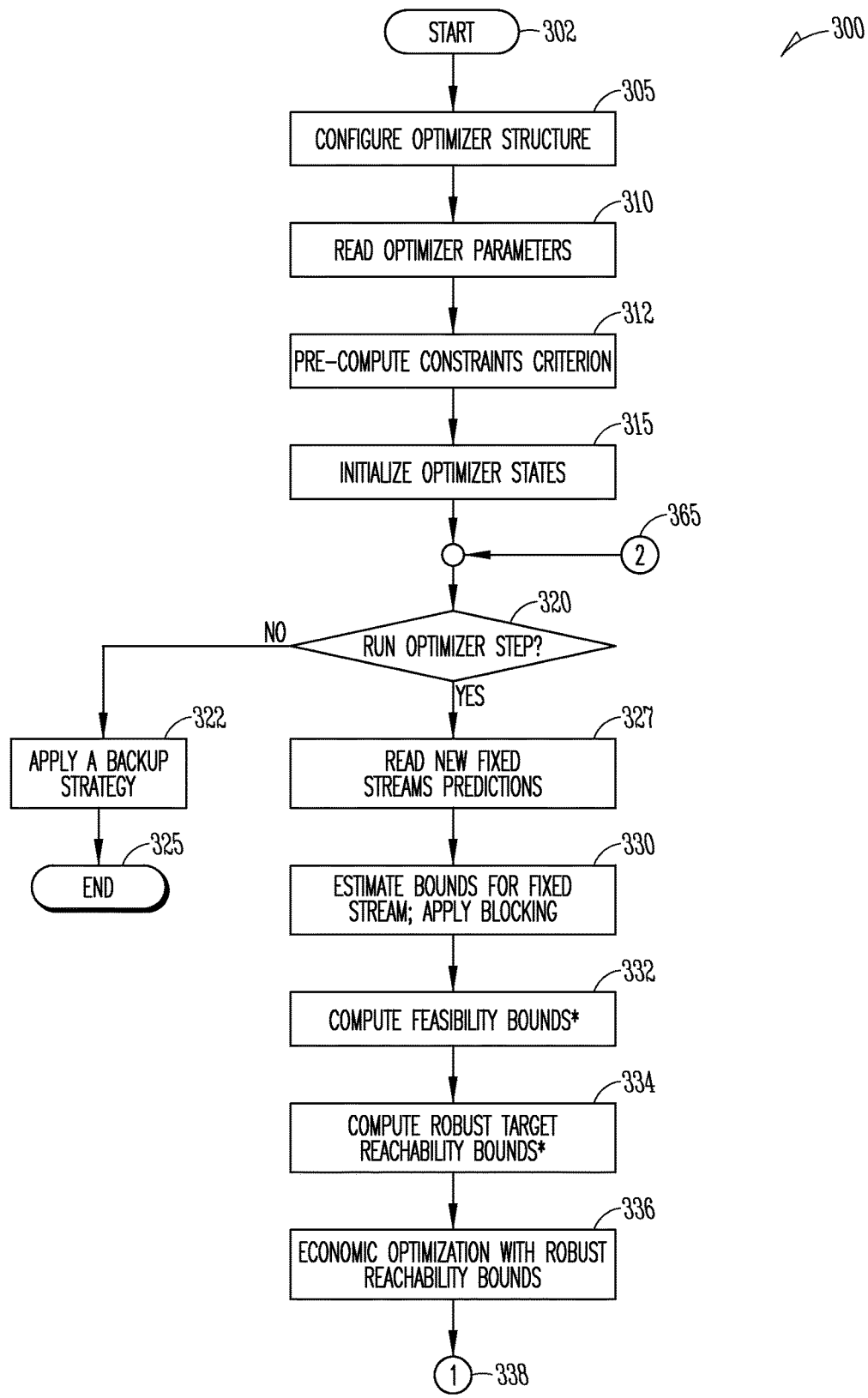
FIGS. 3A and 3B are a flow diagram of an optimizer according to an example embodiment.
Figure 3B:
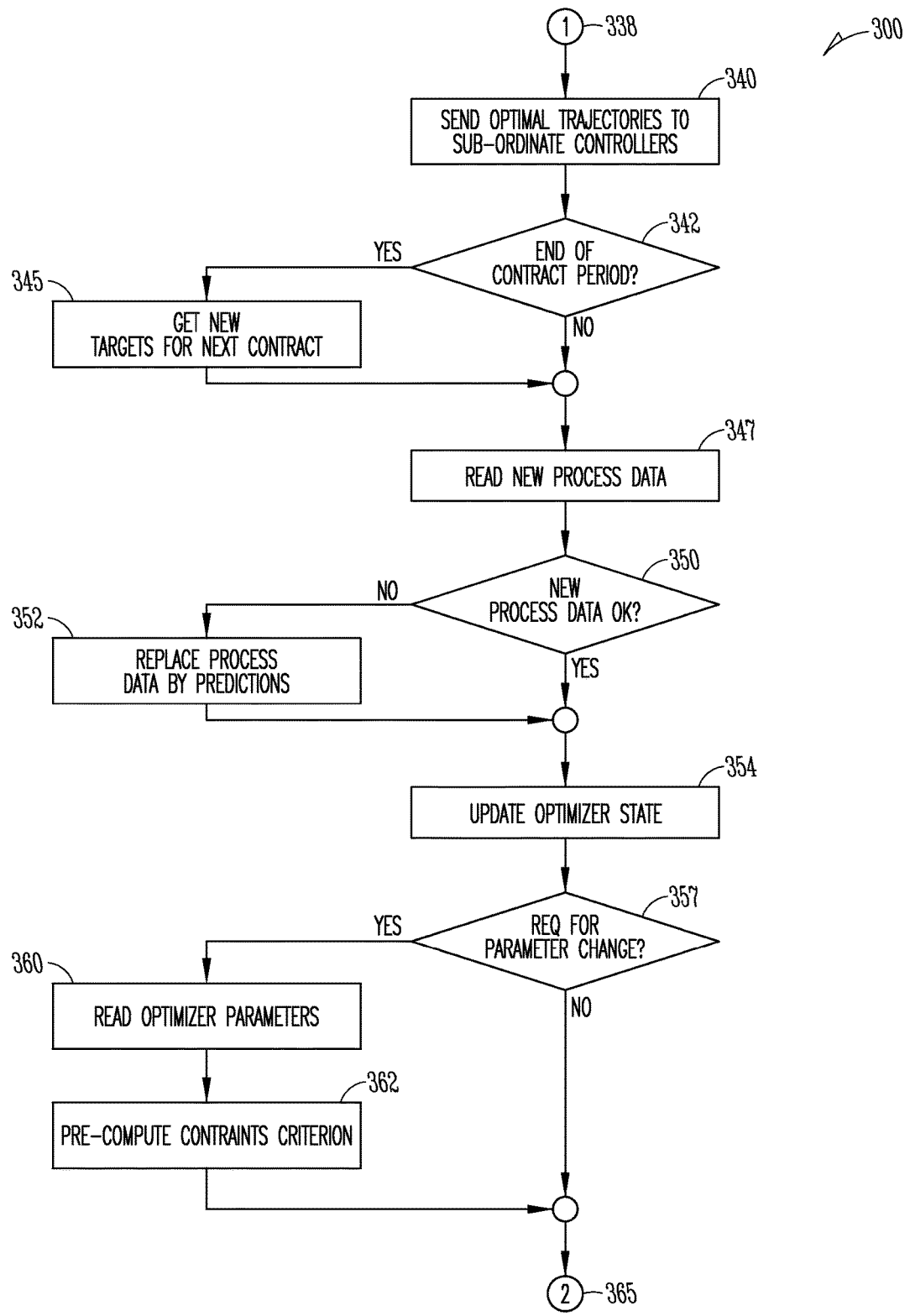

FIGS. 3A and 3B are a flow diagram of an optimizer 300. The optimizer is operated with receding horizon, i.e., each sampling interval, the optimal flows are computed for the time horizon. The computed values for time t+1 are sent to slave controllers as setpoints to be enforced to the process. As this real-time optimizer may be one layer above advanced controllers, it may send predicted trajectories to sub-ordinate MPC's (Model-based Predictive Controllers).

A process 300 implemented by the optimizer starts at 302. Some of the main portions of the process were discussed above and will further be described in detail with additional figures below. As an overview, the optimizer structure is configured at 305. Configuration includes defining the variables described above, structure of the process, and the algorithms to be implemented by the optimizer. Parameters are read into the optimizer at 310. The parameters include the values of all the variables that are know for a given time period. Criterion and constraint parameters are then pre-computed at 312.

The state of the optimizer is then initialized at 315. The state of the optimizer includes states of storages, state of fulfillment of current contracts, times of contract period ends, and historical values of optimized variables. The state model is fairly straight forward, and describes relations between source materials, intermediates, and product flows.

At 320, it is determined whether or not to run the optimizer. If not (due to e.g., a communication failure, or the decision of the operator to control the process manually), a backup strategy may be applied at 322, and the process ends at 325. When the optimizer is run, new fixed stream predictions are read at 327, and bounds for fixed streams are estimated, and blocking is applied. The next part of the process approximates a robust feasibility set in the contract flow space by first computing feasibility bounds at 322, computing robust target reachability bounds 334, and performing an economic optimization with robust reachability bounds at 336. The process then continues at 338.

At 340, optimal trajectories to subordinate controllers are sent. At 342, if the end of a contract period has been reached, new targets for the next contract are obtained at 345. If not, or once the new targets are obtained, new process data is read at 347. At 350, a check is made to determine if the new process data is acceptable or OK. If not, the data is replaced by predictions at 352. At 354, the optimizer 300 state is updated. If a request for parameter change has been received at 357, the new optimizer parameters are read at 360 and new constraints criterion are pre-computed at 362. The parameter change may result from an operator entering new parameters, or new parameters being received from another source. Processing then continues at 365, where the optimizer is run again at 320, or process is backed up at 322 and ended at 325.

Formulation of the Robust Feasibility Set Approximation

A feasibility region, described by a set of linear inequalities is a convex polytope. To obtain its projection into a sub-space of flows of media under contract, a vertex representation of this polytope is used. The projection of the polytope is obtained as a projection of polytope, which is straightforward. However, finding a set of vertices in a region of high dimension and a large number of inequalities is computationally prohibitive. Therefore, an approximation by a sub-set is addressed. Further, a restriction may be made to up to two media flows under contract. If restricted to two, one is a raw material (or source), and the other a product, as in the above example. That is, however, sufficient for a large class of practical problems. For generality, the source and product flows under contract will be referred to as $S_i$ and $P_j$, respectively.

For simplicity, these two flows will be referred to as $S_i$ and $P_j$. The approximated projection of the feasible space is assumed of the form $$P(F) \supseteq P_{t+1}(F) \times P_{t+2}(F) \times \ldots \times P_{t+N}(F). \quad (1.21)$$

It is further assumed that there exist two extreme points defined as $$p^*_{max}(t+k, F) = \left\{ \begin{bmatrix} S_{max} \\ P_{max} \end{bmatrix} \middle| S_{max} = \max\left\{ S1 \middle| \begin{bmatrix} S \\ P \end{bmatrix} \in P_{t+k}(F) \right\}, \quad (1.22) \right.$$

$$P_{max} = \max\left\{ P1 \middle| \begin{bmatrix} S \\ P \end{bmatrix} \in P_{t+k}(F) \right\} \right\}$$

and $$p^*_{min}(t+k, F) = \left\{ \begin{bmatrix} S_{min} \\ P_{min} \end{bmatrix} \middle| S_{min} = \min\left\{ S1 \middle| \begin{bmatrix} S \\ P \end{bmatrix} \in P_{t+k}(F) \right\}, \right.$$

$$P_{min} = \min\left\{ P1 \middle| \begin{bmatrix} S \\ P \end{bmatrix} \in P_{t+k}(F) \right\} \right\}$$

This assumption is reasonable in the given context—it can be expected that the largest product demand can be satisfied under the largest input supply and vice-versa.

Each partial set is assumed bounded by a union of two piecewise-affine boundaries:

$$B_{t+k}(F) = B^1_{t+k} \cup B^2_{t+k} \quad (1.23)$$

where $$B^1_{t+k} = \left\{ \begin{bmatrix} S_B \\ P_B \end{bmatrix} \middle| S_B = \min\left\{ S1 \middle| \begin{bmatrix} S \\ P_B \end{bmatrix} \in P_{t+k}(F) \right\} \right\} \cup \quad (1.24)$$

$$\left\{ \begin{bmatrix} S_B \\ P_B \end{bmatrix} \middle| P_B = \max\left\{ P1 \middle| \begin{bmatrix} S \\ P_B \end{bmatrix} \in P_{t+k}(F) \right\} \right\}$$

$$B^2_{t+k} = \left\{ \begin{bmatrix} S_B \\ P_B \end{bmatrix} \middle| S_B = \max\left\{ S1 \middle| \begin{bmatrix} S \\ P_B \end{bmatrix} \in P_{t+k}(F) \right\} \right\} \cup$$

$$\left\{ \begin{bmatrix} S_B \\ P_B \end{bmatrix} \middle| P_B = \min\left\{ P1 \middle| \begin{bmatrix} S \\ P_B \end{bmatrix} \in P_{t+k}(F) \right\} \right\}$$

Figure 4:
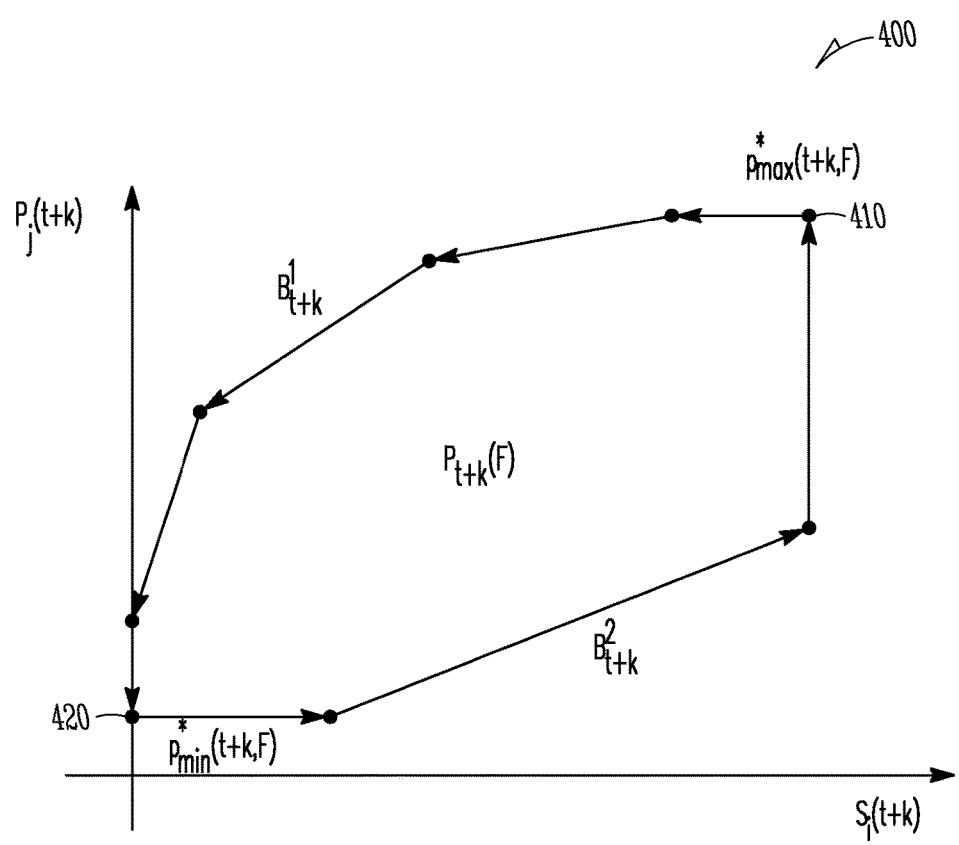
FIG. 4 is a sample projection showing sets and boundary segments according to an example embodiment.

A sample projection is illustrated at 400 in FIG. 4 and shows the sets and boundary segments. It can be assumed that both boundary sets share the above extreme points $p_{max}^*(t+k, F)$ at 410 and $p_{min}^*(t+k, F)$ 420.

Figure 5:
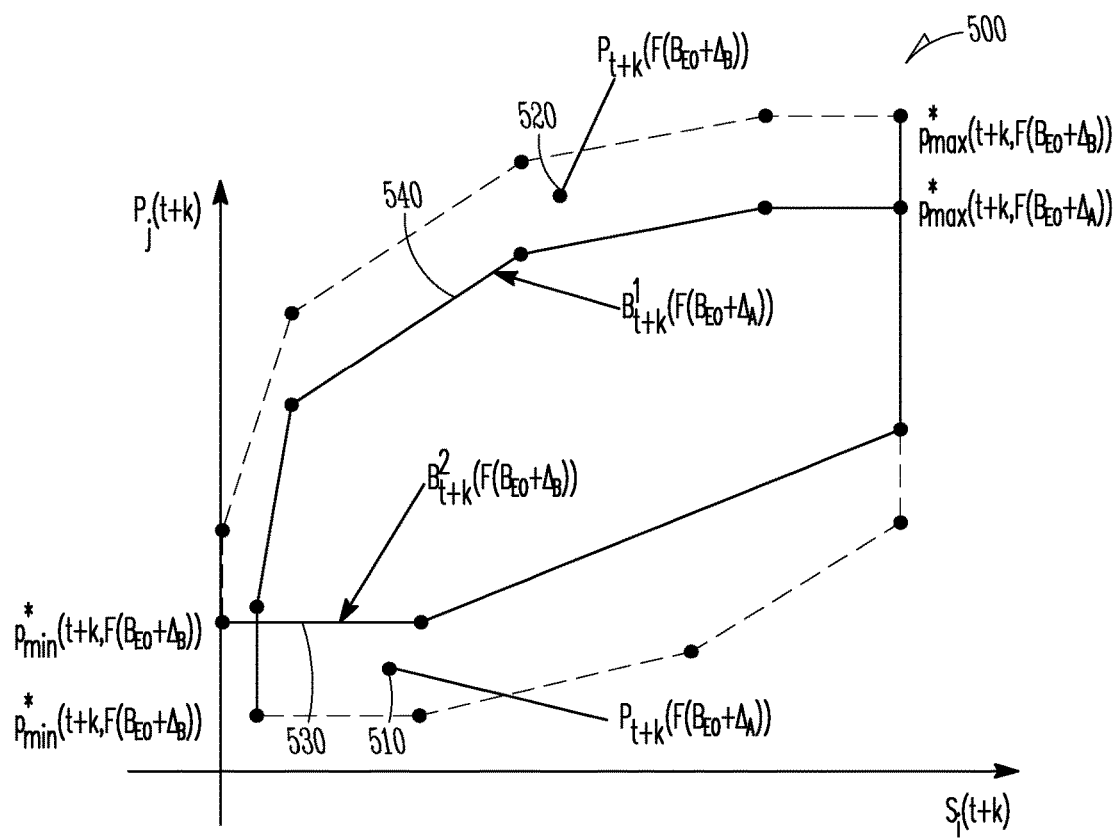
FIG. 5 is a representation of example feasibility sets according to an example embodiment.

Two example feasibility sets are shown at 500 in FIG. 5. It is desired to obtain the intersection of the two feasibility sets $P_{t+k}(F(B_{E0}+\Delta_A))$ indicated at 510 and $P_{t+k}(F(B_{E0}+\Delta_B))$ indicated at 520. From the nature of the problem, it can be assumed that the intersection is bounded by the boundary segment $B_{t+k}^2(F(B_{E0}+\Delta_B))$ 530 from one side and by $B_{t+k}^1(F(B_{E0}+\Delta_A))$ 540 from the other. In other words, to obtain the intersection, it is not necessary to construct complete sets $P_{t+k}(F(B_{E0}+\Delta_A))$ and $P_{t+k}(F(B_{E0}+\Delta_B))$; instead, only relevant boundary segments $B_{t+k}^1(F(B_{E0}+\Delta_A))$ and $B_{t+k}^2(F(B_{E0}+\Delta_B))$ are obtained These boundaries are obtained by solving a series of optimization problems. The boundaries are coupled across the future time frames t+1, . . . , t+N. Moreover, the overall feasibility should be satisfied. Thus the problem is to be optimized over all free flow variables on the optimization horizon. This coupling of the individual time frames is due to the constraints on internal storages. In the given example, the storage is the liquefying gas tank 112. If there are no internal storages, the problem can be addressed separately for each time-frame. In some prior systems, only an electricity contract is considered and hence, only upper and lower bounds on generated power are to be specified.

The boundary computation starts by obtaining extreme points $P_{max}^*(t+k, F)$ and $p_{min}^*(t+k,F)$. The following linear programs are performed:

$$\tilde{X}_{min} = \operatorname{argmin} \sum_{k=1}^{N} S_i(t+k) + P_j(t+k) \text{ s.t. } \tilde{X} \in F \quad (1.25)$$

$$\tilde{X}_{max} = \operatorname{argmin} \sum_{k=1}^{N} S_i(t+k) + P_j(t+k) \text{ s.t. } \tilde{X} \in F$$

Possibly, this problem can be re-cast as a QP one and include a penalty on increments to improve posedness (a unique solution for a time t for each initial set of data). This problem assumes that the variables are scaled so that the ranges for all flows take similar numerical values.

The extreme points $p_{max}^*$ and $p_{min}^*$ are simple projections of the extreme points computed in (1.25) to the space of contract flows $S_1$ and $P_2$. Recall that the feasible set is given by $$F = \{\tilde{X} | A_E \tilde{X} = B_E, A \tilde{X} \leq B, \tilde{X}_{lo} \leq \tilde{X} \leq \tilde{X}_{hi}\} \quad (1.26)$$

where the right-hand sides of equality constraints are the perturbed external flows that need to be supplied/consumed. The inequality constraints will be, for simplifying notation, integrated with the flow limits as $$\tilde{A}\tilde{X} \leq \tilde{B}, \quad \tilde{A} = \begin{bmatrix} A \\ I \\ -I \end{bmatrix}, \quad \tilde{B} = \begin{bmatrix} B \\ \tilde{X}_{hi} \\ -\tilde{X}_{lo} \end{bmatrix} \quad (1.27)$$

In one embodiment, the upper and lower limits are restricted so that $p_{min}^* \leq [S_i(t+k)P_j(t+k)]^T \leq p_{max}^*$.

The boundary segment $B_{t+k}^1(F)$ is obtained, for each time frame, as a piecewise affine function given by connecting a set of points $p^{1(0)}(t+k,F)=p_{max}*(t+k,F)$, $p^{1(1)}(t+k,F)$, ..., $p^{1(M_1)}(t+k,F)=p_{min}*(t+k, F)$; these points (vertices) are computed incrementally as $$p^{1(s)}(t+k,F)=p^{1(s-1)}(t+k,F)+dp^{1(s)}(t+k,F), \quad s=1, 2, \ldots \atop M_1 \quad (1.28)$$

Figure 6:
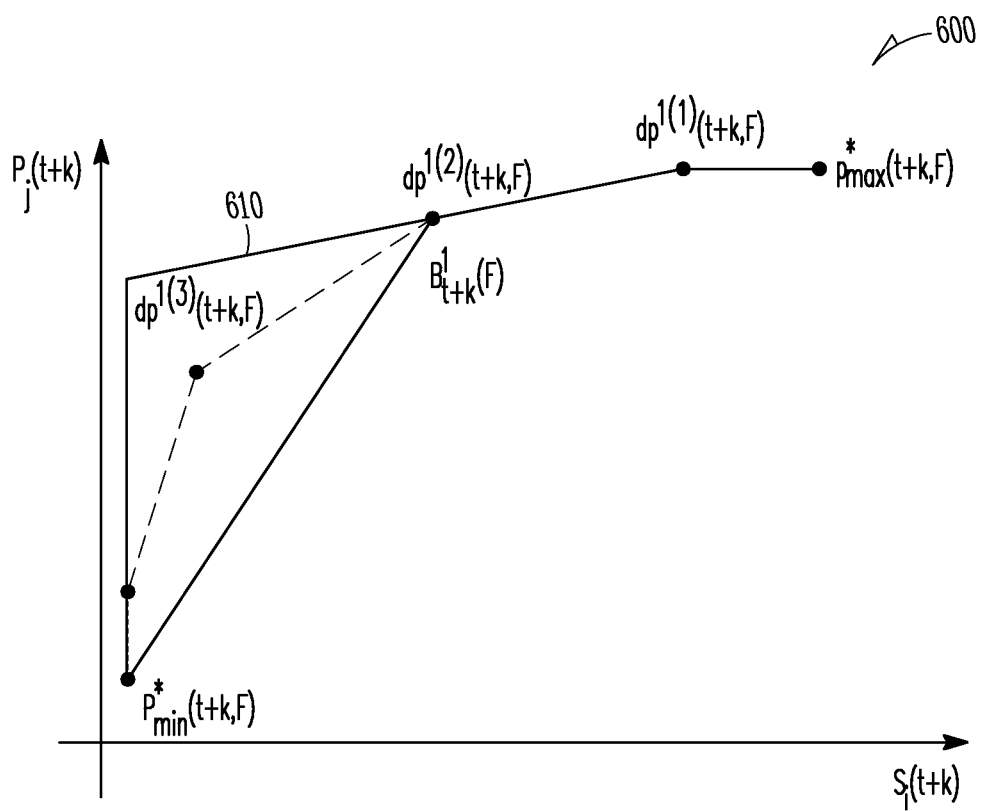
FIG. 6 is a representation of boundary segment vertices according to an example embodiment.

This is shown at 600 in FIG. 6. Points $p^{(j)}(t+k,F)$ are 2D projections of global flow trajectories $\tilde{X}^{(j)}(F)$ that belong to the feasible set F. These projected points may co-inside ($dp^{(j)}(t+k,F)=0$), or lie in a middle of an edge of $B_{t+k}^1(F)$, i.e., $dp^{(j)}(t+k,F)$ and $dp^{(j+1)}(t+k, F)$ may be co-linear for some j. Special care should be taken to ensure that the resulting set $P_{t+k}(F(B_{E0})+\Delta_A))$ is convex, and the boundary line reaches the extreme point; this is ensured by imposing constraints on increments $dp^{(j)}(t+k,F)$. Constraints on these increments in the form of a cone (in addition to the constraints as given above) are shown in FIG. 6. In particular, the tangent 610 for the bound is bounded from below by the slope of the previous step. This guarantees the convexity of the bound in the $S_i \times P_j$ space. The upper bound for the slope is given by the tangent of the line connecting the last obtained corner of the boundary and the target point $p_{min}*$ Alternatively, it would be possible to start from the other extreme point $p_{min}*(t+k, F)$ and continue towards $p_{max}*(t+k,F)$. As the problems associated with solving the increments are not perfectly posed, the resulting bounds may not be equivalent. Nevertheless, it is guaranteed that the intermediate points are projections of feasible trajectories, and hence, the set bounded by the obtained line is indeed feasible.

A flow chart for computing feasibility bounds is illustrated at 700 in FIG. 7. The process 700 starts at 702, and at 710, right-hand-side (RHS) or equality constraints is perturbed by uncertainty $\Delta_A$. At 715, a direction option is set to −1, indicating that the algorithm proceeds from $p_{min}*$ to $p_{max}*$. At 720, a sequence of boundary points is obtained, and at 725, projections of boundary points belonging to $B_{t+k}^1$, $k=1, 2, \ldots, N$ are stored. Next, at 730 a set of RHS of equality constraints is perturbed by uncertainty $\Delta_B$. The opposite direction option is specified at 735, and a sequence of boundary points is obtained at 740. At 745, the projections $B_{t+k}^2$ for $k=1, 2, \ldots, N$ are stored.

In general, several steps are involved in computing the sequences of boundary points of two boundary segments, each for a different uncertainty value. The increments between two boundary points are computed, in the full flow space, as a result of a multi-stage optimization. Let $s_g=1$ if the computation proceeds from $p_{max}*$ to $p_{min}*$, $s_g=1$ otherwise. In the following we considered proceeding with $s_g=1$ when computing the bound segment $B_{t+k}^1$ and $s_g=1$ for $B_{t+k}^2$.

The three stages are as follows:

First, a feasibility check is done, for which time instants $t+k$, $k=1, \ldots, N$, it is possible to progress in the direction of the $S_i(t+k)$ axis. The progress is limited to a small increment, $0 \leq s_g \cdot \delta S_i^{(j)}(t+k) \leq \delta S_{i\,min}$. The limit $\partial S_{i\,min}$ is chosen a priori.

In the second stage, the progress in the $S_i(t+k)$ direction computed in the previous stage is fixed. If $\delta S_i(t+k)$ is nonzero, maximum increment $\Delta P_j(t+k)$ in the $P_j(t+k)$ direction is sought. This gives the smallest slope $\Delta P_j/\delta S_i$.

Figure 8:
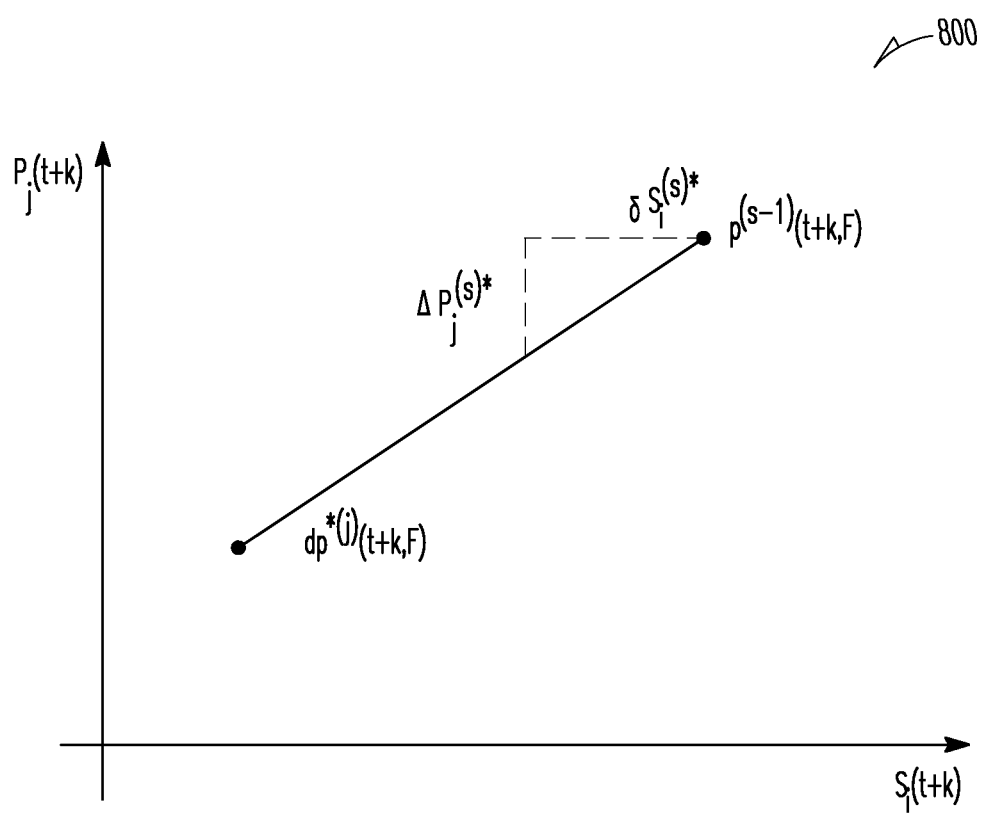
FIG. 8 is a representation of determining a maximum step forward between boundary points according to an example embodiment.

In the third stage, a maximum step forward is looked after, with the slope fixed to the value obtained in the previous stage as illustrated at 800 in FIG. 8.

These steps between boundary points are computed as optimization tasks over the full space of flow variables. In the process, a careful constraint management is done. In the first stage, only the set of active constraints (i.e., those which are satisfied as equalities) for $p^{(j-1)}$ is used. The same active set is used in the second stage; however, those which were satisfied as equalities for solution of the first stage are forced as equalities in the second stage [0071]. The third stage uses the full set of constraints of the original problem; those, which are satisfied as equalities in the second stage are forced as equalities. This constraint handling is applied in order to force progress along the boundary set if possible.

Figure 9A:
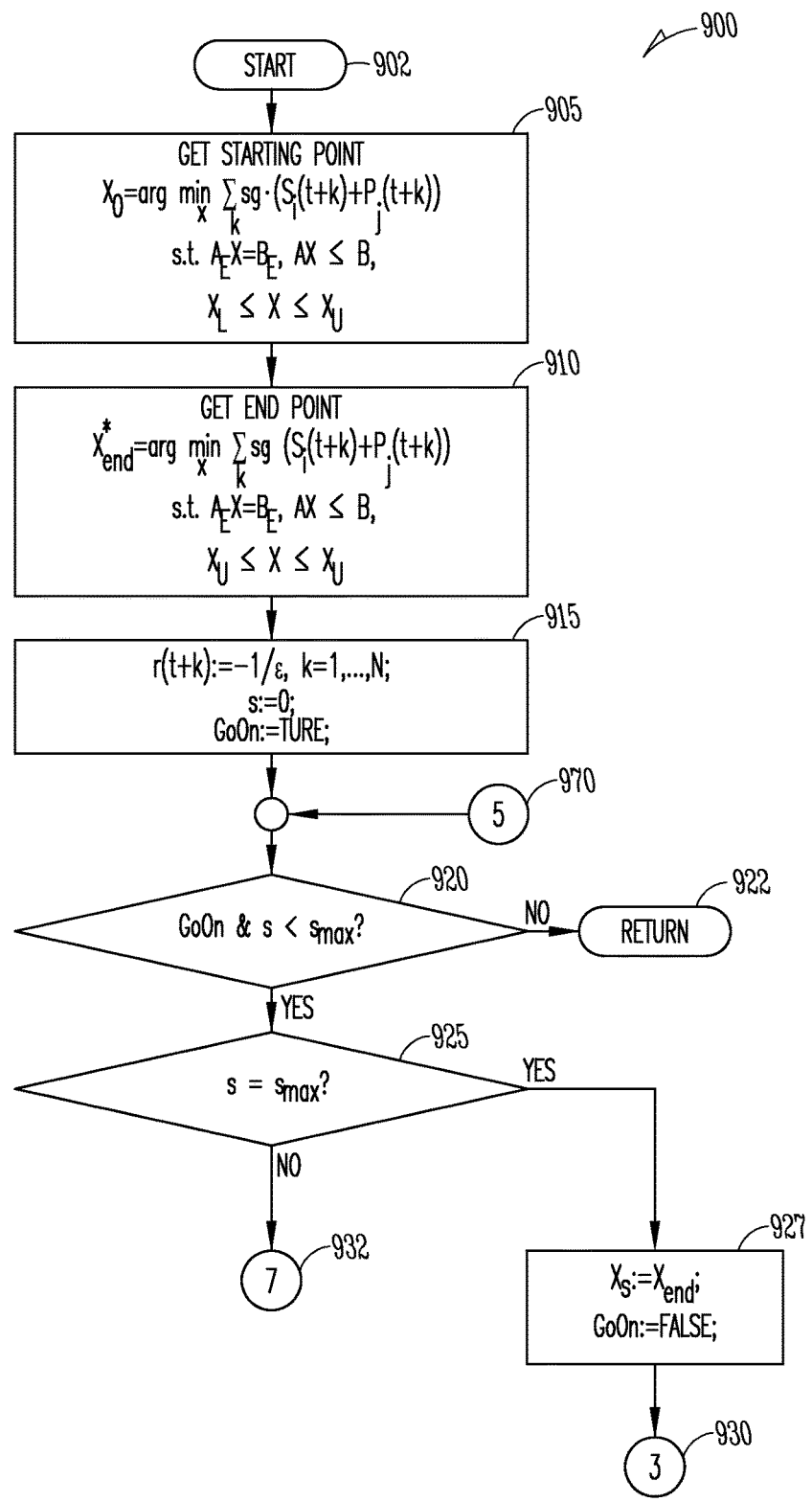
FIGS. 9A, 9B, and 9C are flow charts illustrating computing increments with explicitly formulated optimization tasks according to an example embodiment.
Figure 9B:
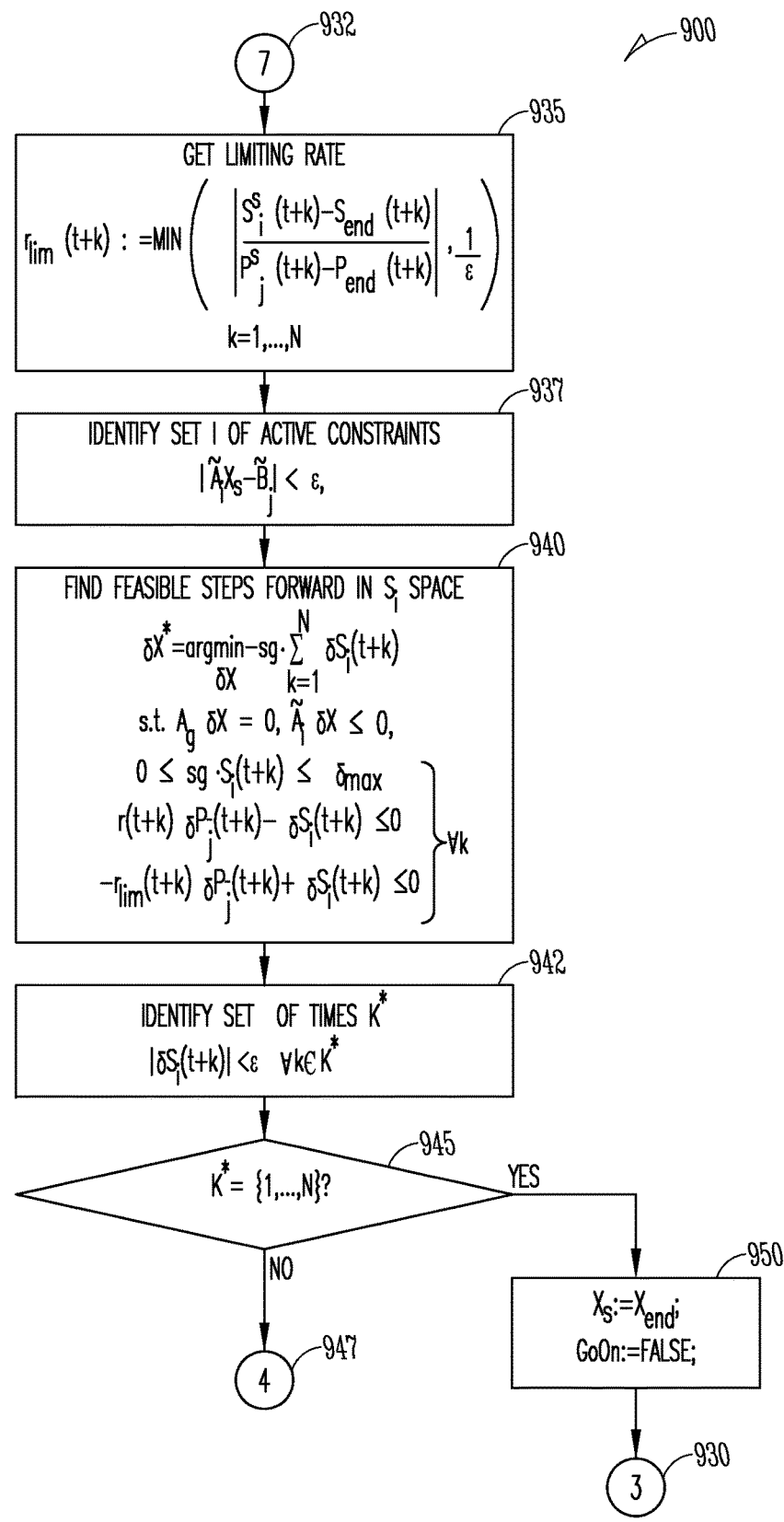
Figure 9C:
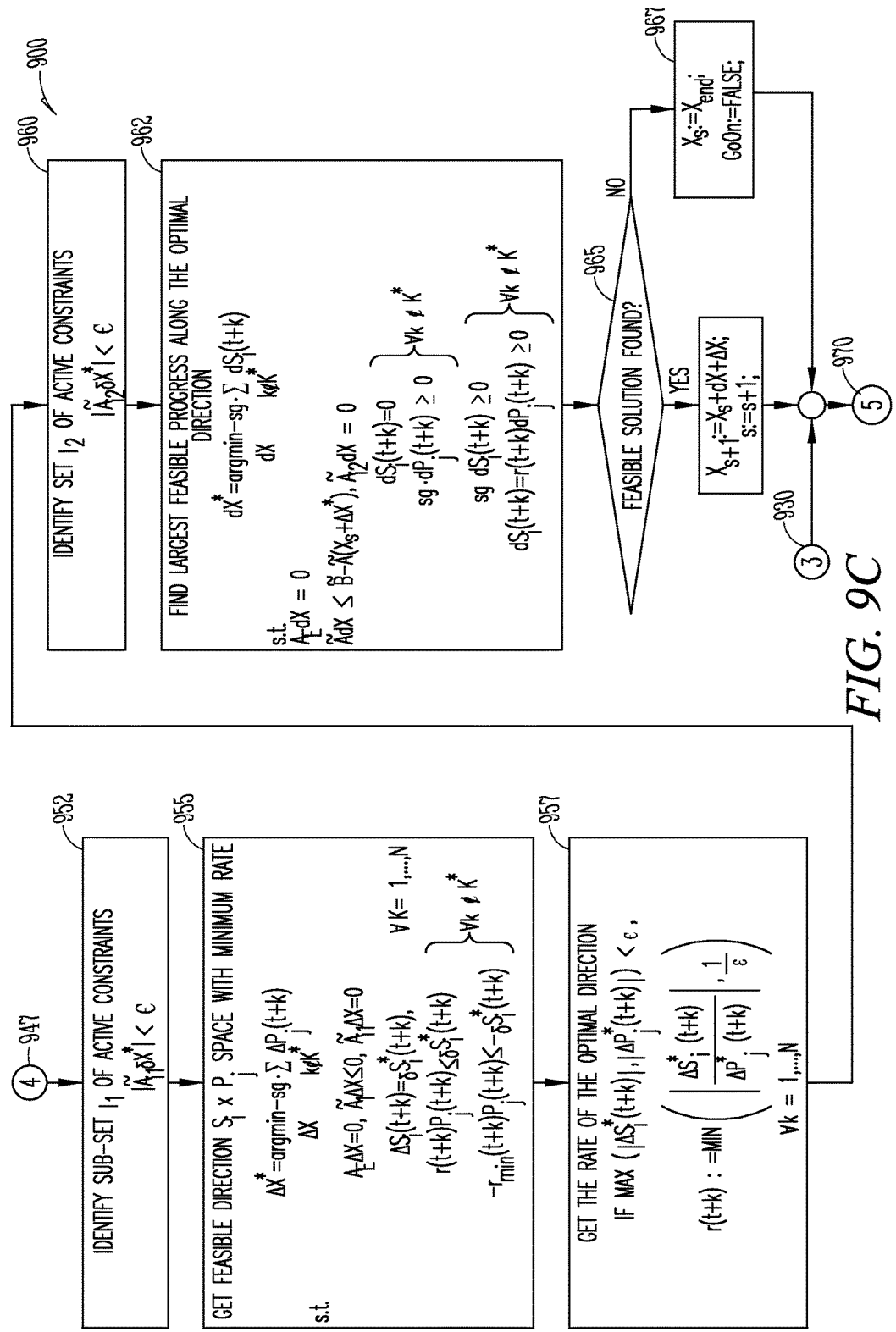

Next, it will be described, in the step-by-step manner, how to compute the increment $d\tilde{X}^{(s)}(F)=\tilde{X}^{(s)}(F)-\tilde{X}^{(s-1)}(F)$, with explicitly formulated optimization tasks stated in the stages above. A flow chart of a method 900 is shown in FIGS. 9A, 9B, and 9C. Method 900 starts at 902, and at 905, a starting point is obtained. An end point is then obtained at 910. At 915, some parameters are initialized. A check is made at 920 to determine if $s<s_{max}$. If not, the process ends at 922. Otherwise, a check is made to determine if s=s at 925. If yes, further parameters are set at 927, and processing continues at 930. If no, processing continues at 932.

At 935, a limiting rate is obtained, and at 937, a set of active constraints is identified. At 940, feasible steps forward in $S_i$ space are found. A set of times K* is then identified at 942 for which no progress towards the endpoint is feasible. A check is made on K* at 945 if this set of points of no progress is the full set of times k=1, 2, ..., N. If not, processing continues at 947. Otherwise, a flag is set indicating that the process is ending and the last point in the sequence is set to the pre-computed endpoint at 950. This is the standard end of the algorithm. Processing continues at 930.

At 952, a sub-set $I_1$ of active constraints is identified. At 955, a feasible direction in $S_i \times P_j$ space with minimum slope is obtained. The rate of optimal direction is then obtained at 957, and a set $I_2$ of active constraints is identified at 960. At 962, a largest feasible progress along the optimal direction is found. If a feasible solution is no found at 965, parameters are set at 967. processing then continues at 970.

The steps in the main cycle of this procedure, i.e. from label 5 at 970 in FIGS. 9A-C on will be described in further detail.

1. Compute the limiting tangent for the boundary segment as $$r_{lim}^{(s)}(t+k) = \begin{cases} \dfrac{\Delta P_j^{(s-1)}(t+k)}{\Delta S_i^{(s-1)}(t+k)} & \text{if} \quad |\Delta S_i^{(s-1)}(t+k)| > \varepsilon \\ r_{lim}^{(s-1)}(t+k) & \text{if} \quad \min\left(\begin{array}{c}|\Delta S_i^{(s-1)}(t+k)|,\\ |\Delta P_j^{(s-1)}(t+k)|\end{array}\right) \leq \varepsilon \\ R_{max} & \text{otherwise} \end{cases} \quad (1.29)$$

where $\Delta P_j^{(s-1)}(t+k)=P_j^{(s-1)}(t+k)-P_{jend}*$ and $\Delta S_i^{(s-1)}(t+k)=S_i^{(s-1)}(t+k)-S_{iend}*$. The symbol e denotes a chosen tolerance. This tangent is used to limit the ascend/descend of the boundary, in order not to miss the pre-computed end-point of the sequence.

2. Find the set I of constraints (1.27) which are active for the point $\tilde{X}^{(j-1)}(F)$, i.e., all equality constraints, and those inequality ones that are attained as equalities; Denote $\tilde{A}_I$ and $\tilde{B}_I$ those rows of $\tilde{A}$ and $\tilde{B}$, respectively, so that $|A_I\tilde{X}^{(j-1)}-\tilde{B}_I|<\epsilon$.

3. Solve the linear program $$\min_{\delta \tilde{X}^{(s)}} -\sum_{k=1}^{N} s_g \delta S_i^{(s)}(t+k) \text{ s.t.} \quad (1.30)$$

-continued $$A_E \delta \tilde{X}^{(s)} = 0, A_I \delta \tilde{X}^{(s)} \le 0,$$

$$\left. \begin{array}{l} \delta_{min} \le s_g \delta S_i^{(s)}(t+k) \le 0 \\ \delta P_j^{(s)}(t+k) - r^{(s-1)}(t+k) \delta S_i^{(s)}(t+k) \le 0 \\ \delta P_j^{(s)}(t+k) - r_{lim}^{(s)}(t+k) \delta S_i^{(s)}(t+k) \ge 0 \end{array} \right\} \forall k$$

There, $\delta_{min}$ is a positive number; further, $r^{(s-1)}$ is the boundary tangent from the last step. It is used to limit the current boundary tangent from below and thus forcing convexity of the boundary set.

This step finds time frames in which it is feasible to make any (however small) step towards the target—extreme point $\tilde{X}_{end}$. The solution of (1.30) is denoted as $\delta \tilde{X}^{*(s)}$.

4. Find set of time frames $K^*\{k \| \delta S_i^{(s)}* | < \epsilon\}$ for which no progress is feasible 5. If $K^* = \{1, 2, \ldots, N\}$, i.e., no progress is possible, set $\tilde{X}^{(s)} = \tilde{X}_{end}$ and exit the boundary segment computation process. This is the normal exit point of the algorithm.

6. Find the set of rows of $\tilde{A}_I$ so that for matrix $\tilde{A}_{I1}$ containing these rows satisfies $|\tilde{A}_{I1} \text{ of}(s)| < \epsilon$. The complement of $\tilde{A}_{I1}$ to $\tilde{A}_I$ is denoted as $\tilde{A}_{I1}^C$.

7. Solve optimization problem $$\min_{\Delta \tilde{X}^{(j)}} - \sum_{k \notin K^*} s_g \Delta P_j^{(s)}(t+k) \text{ s.t.} \quad (1.31)$$

$$A_E \Delta \tilde{X}^{(s)} = 0, \tilde{A}_{I1}^{(s)} \Delta \tilde{X}^{(s)} = 0, \tilde{A}_{I1}^{C(s)} \Delta \tilde{X}^{(s)} \le 0$$

$$\Delta S_i^{(s)}(t+k) = \delta S_i^{(s)*}(t+k) \forall k$$

$$\Delta P_j^{(s)}(t+k) \le r^{(s-1)}(t+k) \delta S_i^{(s)*}(t+k) \forall k \notin K^*$$

$$\Delta P_2^{(s)}(t+k) \ge r_{lim}^{(s)}(t+k) \delta S_i^{(s)*}(t+k) \forall k \notin K^*$$

$$\Delta P_j^{(s)}(t+k) \le 0 \forall k \in K^*$$

There, the projection of the optimal solution (1.31) to the S axis was fixed to the values of the previous steps. The goal of this optimization is to find the increment $\Delta P_j^{(s)}$ so that the tangent of the boundary is minimized (and hence, the area of the feasible set approximation is maximized). The solution of (1.31) is denoted as $\Delta \tilde{X}^{*(s)}$.

8. Update the optimal tangent in the current boundary segment for all k as $$r^{(s)}(t+k) = \begin{cases} \dfrac{\Delta P_j^{*(s)}(t+k)}{\delta S_i^{*(s)}(t+k)} & \text{if } |\delta S_i^{*(s)}(t+k)| > \varepsilon \\ r^{(s-1)}(t+k) & \text{if } \min\left(\begin{array}{l} |\delta S_i^{*(s)}(t+k)|, \\ |\Delta P_j^{*(s)}(t+k)| \end{array}\right) \le \varepsilon \\ R_{max} & \text{otherwise.} \end{cases}$$

9. Find the latest active constraint set $I^*_3$ represented by matrix $\tilde{A}_{I3}$, satisfying $|\tilde{A}_{I3} \Delta \tilde{X}^{*(s)}| < \epsilon$. The complement of this set to the overall set of constraints is represented by matrix $\tilde{A}_{I3}^C$; consisting of rows of matrix $\tilde{A}$. The corresponding rows of vector $\tilde{B}$ is denoted as $\tilde{B}_{I3}^C$.

10. Solve the linear program $$\min_{d\tilde{X}^{(s)}} - \sum_{k \notin K^*} (-s_g) \cdot dS_i^{(s)}(t+k) \text{ s.t.} \quad (1.32)$$

$$A_E d\tilde{X}^{(s)} = 0, \tilde{A}_{I3} d\tilde{X}^{(j)} = 0,$$

$$\tilde{A}_{I3}^C d\tilde{X}^{(s)} \le \tilde{B}_{I3}^C - \tilde{A}_{I3}^C \tilde{X}^{(s-1)}$$

$$dP_j^{(s)}(t+k) = r(t+k) dS_i^{(s)}(t+k) \forall k \notin K^*$$

$$dS_i^{(s)}(t+k) \le 0 \forall \notin K^*$$

$$dS_i^{(s)}(t+k) = 0 \forall \in K^*$$

$$dP_j^{(s)}(t+k) \le 0 \forall k \in K^*$$

This optimization problem finally computed the optimal increment for the boundary segment.

11. If feasible solution to the above problem was found, update the boundary point to $\tilde{X}^{(s)} = \tilde{X}^{(s-1)} + d\tilde{X}^{*(s)}$, where $d\tilde{X}^{*(s)}$ is the solution of (1.32). Increment s and go to Step [0078];

Otherwise, set $\tilde{X}^{(s)} = \tilde{X}_{end}$ and return. This latter case is an emergency response to the solver failure.

It is not a priori obvious how many boundary points are needed to compute. A test on exceeding a maximum iteration count may be implemented. If it is achieved without proper exit in Step 5, set $\tilde{X}^{(s)} = \tilde{X}_{end}$.

Also in the above cases it is possible to re-cast the problem as quadratic programming (QP) and add a small penalty on the rate-of-change of the respective flows.

Transforming Feasibility Sets to Target Reachability Sets

Target reachability sets were defined above in Section Robust reachability set of contract variables. Here we shall give an algorithm for obtaining this set from the feasibility set in the contracting flow variables dealt with in the previous paragraph; in the example used earlier. The robust reachability sets are in the space of accumulated amounts (volume, energy) produced or consumed since the beginning of the contracting period.

As previously described, the feasibility set is obtained as a Carthesian product of polytopic sets for each time instant, $P_{t+1} \times \ldots \times P_{t+N}$. Each polytope $P_{t+k}$ is obtained as an intersection of two sets, each for a different uncertainty, $P_{t+k} = P_{t+k}(F(B_{E0} + \Delta_A)) \cap P_{t+k}(F(B_{E0} + \Delta_B))$. It was assumed that this intersection can be bounded by segments $B_{t+k}^1(F(B_{E0} + \Delta_A))$ and $B_{t+k}^2(F(B_{E0} + \Delta_B))$. Each of the boundary segments bounds a convex unbounded part of the plane and their intersection is $P_{t+k}$. They are represented as sets of vertices, $$B_{t+k}^1(F(B_{E0} + \Delta_A)) = \{p_1^A(t+k), \ldots, p_{m_{Ak}}^A(t+k)\},$$

$$B_{t+k}^2(F(B_{E0} + \Delta_B)) = \{p_1^B(t+k), \ldots, p_{m_{Bk}}^B(t+k)\}.$$

For a large uncertainty, the intersection $P_{t+k}$ can be empty. In that case the robust optimal problem forces the trajectory to be as close to these bounds (now bounding two sets with no intersection) as possible.

As for the robust target reachability set, the same representation is used, i.e., is defined as $T_{t+1} \times \ldots \times T_{t+K}$, where $t+K$ is the end of the contracting period. The polytopic sets $T_{t+k}$ are represented by boundary segments:

$$C_{t+k}^1(F(B_{E0} + \Delta_B)) = \{q_1^B(t+k), \ldots, q_{n_{BK}}^B(t+k)\}, \quad (1.33)$$

$$C_{t+k}^2(F(B_{E0} + \Delta_A)) = \{q_1^A(t+k), \ldots, q_{n_{AK}}^A(t+k)\}.$$

for $k = K$,

-continued $$C_{t+K}^1(F(B_{E0}+\Delta_B)) =$$

$$C_{t+K}^2(F(B_{E0}+\Delta_A)) = \{q_{targ}\} = \left\{ \begin{bmatrix} V_{S_i trg} \\ V_{P_j trg} \end{bmatrix} \right\},$$

the a-priori known target point. Alternatively, the set $T_{t+k}$ san be chosen as a convex polytope containing the target value.

The set is computed recursively, for k=K−1, K−2, . . . 1 as follows

I. Get Intermediate Sets $$\overline{C}_{t+k}^2(F(B_{E0}+\Delta_A)) = \qquad (1.34)$$
$$\left\{ \begin{array}{l} q_1^A(t+k-1) - T_s p_1^A(t+k), \ldots q_1^A(t+k-1) - \\ T_s p_{m_{AK}}^A(t+k), \ldots \ldots, q_{n_{Ak-1}}^A(t+k-1) - \\ T_s p_1^A(t+k), \ldots q_{n_{Ak-1}}^A(t+k-1) - T_s p_{m_{AK}}^A(t+k) \end{array} \right\};$$

$$\overline{C}_{t+k}^1(F(B_{E0}+\Delta_B)) = \qquad (1.35)$$
$$\left\{ \begin{array}{l} q_1^B(t+k-1) - T_s p_1^B(t+k), \ldots q_1^B(t+k-1) - \\ T_s p_{m_{BK}}^B(t+k), \ldots \ldots, q_{n_{Bk-1}}^B(t+k-1) - \\ T_s p_1^B(t+k), \ldots q_{n_{Bk-1}}^B(t+k-1) - T_s p_{m_{BK}}^B(t+k) \end{array} \right\};$$

Figure 10:
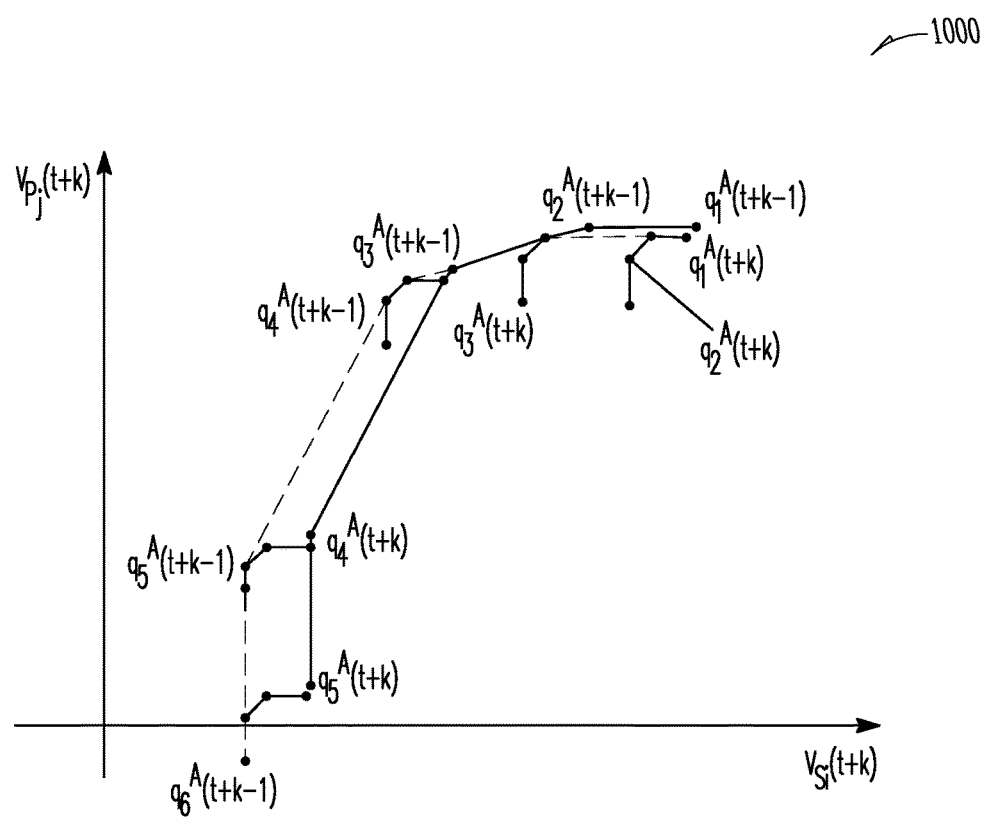
FIG. 10 illustrates a convex set of vertices according to an example embodiment.

II. Obtain $C_{t+k}^1(F(B_{E0}+\Delta_B))$ and $C_{t+k}^2(F(B_{E0}+\Delta_A))$ as sets of vertices which make convex approximation of $\overline{C}_{t+k}^1(F(B_{E0}+\Delta_B))$ and $\overline{C}_{t+k}^2(F(B_{E0}+\Delta_A))$, respectively. This means that
  a. $C_{t+k}^1(F(B_{E0}+\Delta_B))$ $(C_{t+k}(F(B_{E0}+\Delta_A)))$ bound the largest convex sets in the $V_{S_i}(t+k) \times V_{P_j}(t+k)$ plane
  b. No point of $\overline{C}_{t+k}^1(F(B_{E0}+\Delta_B))$ $(\overline{C}_{t+k}^2(F(B_{E0}+\Delta_A)))$ is left outside the convex set, see FIG. 10 at 1000.
III. Eliminate redundant vertices to prevent uncontrolled growth of their number as k decreases. Remove:
  a. Vertices, whose removal would not affect significantly the area of the set (as adjacent edges being nearly co-linear).
  b. Vertices that are not relevant (on an edge that is in an inaccessible region, e.g., in the part of the plane for negative volumes).
IV. Transform the vertex representation of the boundary to one given by inequalities.

Figure 11:
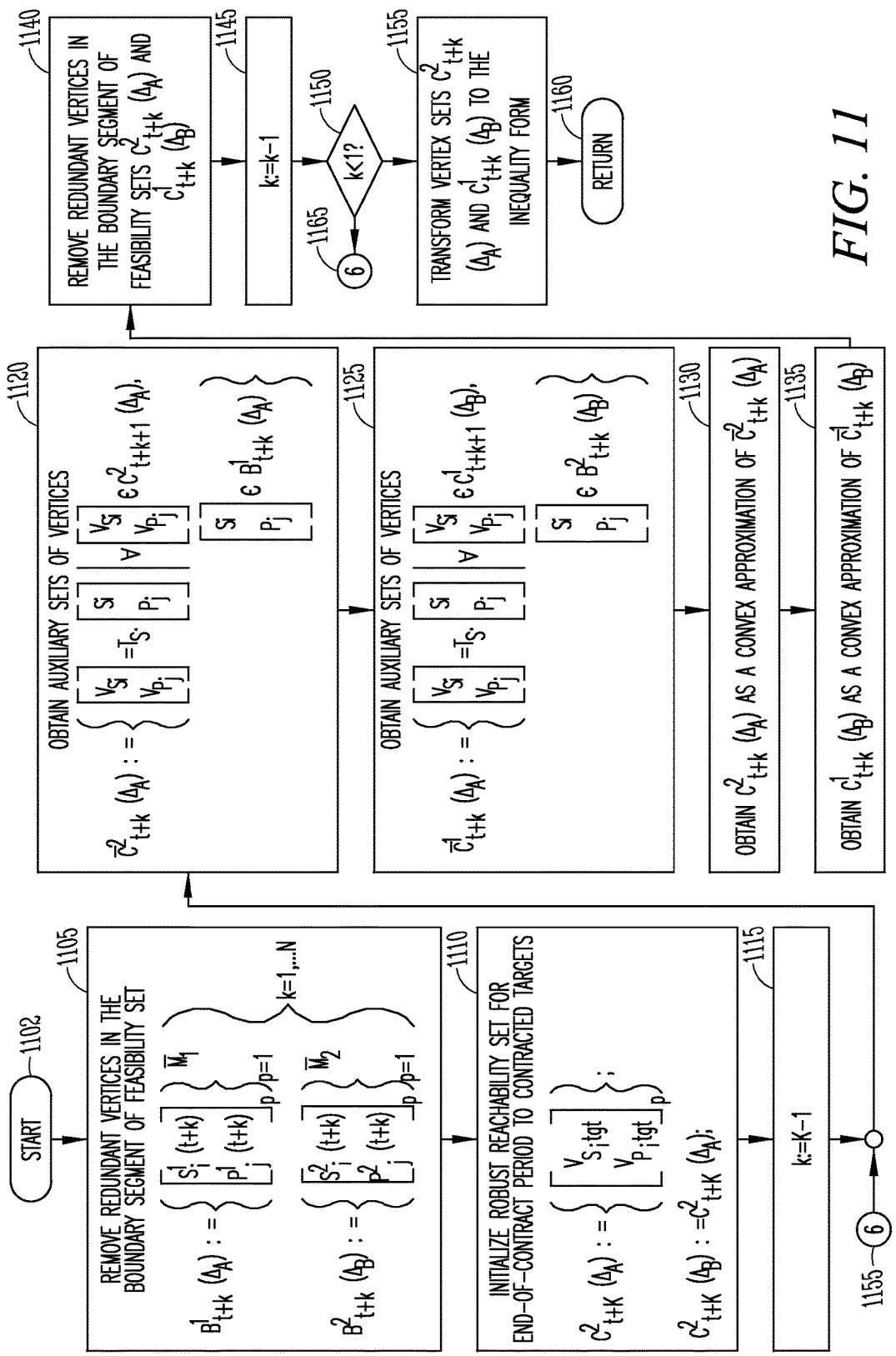
FIG. 11 is a flowchart illustrating a process for transforming feasibility sets to target reachability sets according to an example embodiment.

FIG. 11 is a flowchart illustrating a process 1100 for transforming feasibility sets to target reachability sets as described above. The process starts at 1102, and at 1105, redundant vertices in the boundary segment of the feasibility step are removed. At 1110, a robust reachability set for end of contract period to contracted targets is initilialized. K is set to K−1 at 1115, and at 1120, an auxiliary set of vertices is obtained for a segment of the reachability set boundary denoted by superscript 2, for uncertainty $\Delta_A$. At 1125, in a manner analogous to 1120, for the complementary set of bounds labeled by superscript 1 and for uncertainty $\Delta_A$, a set of vertices is obtained. A convex approximation is obtained at 1130. At 1140, redundant vertices in the boundary segment of feasibility sets are removed. At 114, k is set to k−1. If k<1 at 1150, the algorithm proceeds by exiting the loop and vertex sets are transformed to the inequality form at 1155, and the process returns at 1160 to the upper level. If not, loop continues at 1165.

Figure 12:
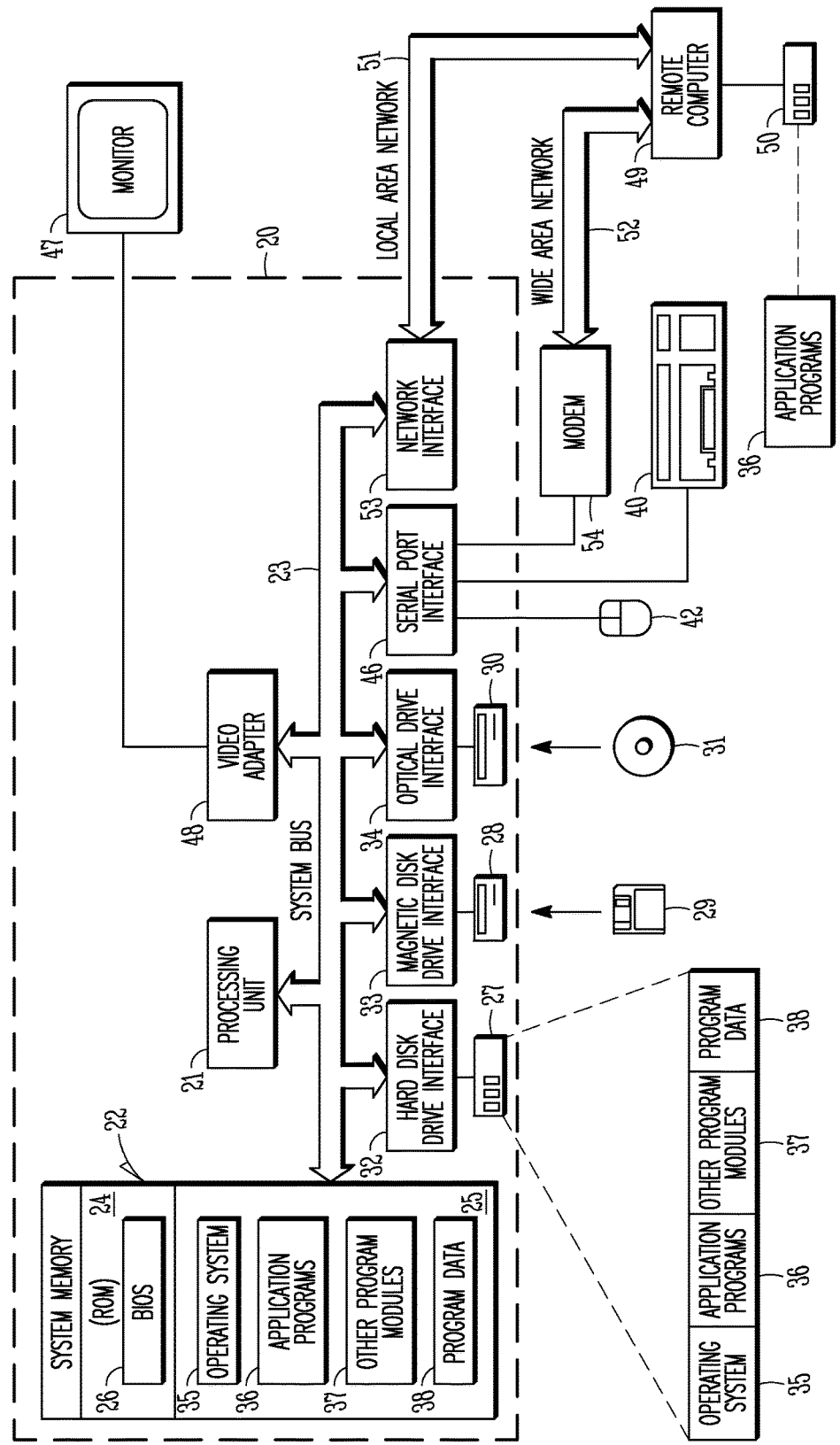
FIG. 12 is block diagram of a computer system to implement methods according to an example embodiment.

FIG. 12 is a block diagram of a computer system to implement methods according to an example embodiment. In the embodiment shown in FIG. 12, a hardware and operating environment is provided that is able to receive input, execute a program embodying the optimizer and algorithms described, and provide output to allow management of source material and output from a process being optimized. The computer system is also representative of a process controller that receives input from the optimizer to control the process in an economical manner, including utilizing source materials differently, such as storing higher cost source materials if cheaper materials are readily available. Intermediates and product flows may also be varied as a function of the output of the optimizer.

As shown in FIG. 12, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. Programming for implementing one or more processes or method described herein may be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 12 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method of optimizing a manufacturing process having source materials, intermediates, products and media storages, the method comprising:

obtaining a model describing relations between source materials, intermediates and product flows;

setting upper and lower bounds for each of the source materials, intermediates and product flows, for storage capacities and for combinations of multiple flows;

obtaining a set of external flows constrained to specified values including at least one source whose supply has to be fully consumed and at least one product whose demand has to be fully satisfied;

determining estimates of future values of these constrained external flows as well as estimates of the upper and lower bound of those flows;

determining a set of external flows with requirements on total production or consumption for fixed periods of time, where these requirements are subject to contracts, periodically negotiated with distribution network operators;

obtaining varying costs of raw materials and products and their predictions;

computing flows of sources, intermediates and products so that all constraints are satisfied and the profit is maximized over a time horizon and, produced/consumed amounts of media under contract since the beginning of contracting period are within a region guaranteeing satisfying the contract for any combination of trajectories of fixed external flows from the pre-specified bounds;

sending the optimal future trajectories or only the next step values of the optimized flows to sub-ordinate controllers to be enforced on the process;

receiving process values to update internal states from lower control layers or operating in open loop and replacing them by estimates from the previous step; and repeating the process of determining estimates of future values of constrained external flows and their upper and lower bounds, acquiring varying costs, computing optimal flows, sending the optimal future trajectories and receiving process values with an optimization horizon moved one time-step forward.

2. The method of example 1 wherein a requirement of produced/consumed amounts of media under contract since the beginning of contracting period being in a region guaranteeing satisfying the contract for any combination of trajectories of fixed external flows from the pre-specified bounds is implemented as a soft constraint adding a penalty on the square of the distance of the trajectory from the region to the optimization criterion with a suitable weighting parameter.

3. The method of example 1 or 2 where an optimization cost function for computing flows contains also a penalty for deviations of produced/consumed amounts of media during the fixed contract interval from the targets specified by the contract.

4. The method of any of examples 1-3 where an optimization cost function for computing flows contains also a penalty on squares of time increments of flows in order to achieve smooth and well posed solution.

5. The method of any of examples 1-4 wherein media flow variables are allowed to change only at specific time instants on the future time horizon and are identified as part of a blocking set.

6. The method of any of examples 1-5 wherein the optimization horizon includes more than one contracting period.

7. The method of any of examples 1-6 and further comprising initializing a state of the optimizer, wherein the state of the optimizer includes states of storages, state of fulfillment of current contracts, times of contract period ends, and historical values of optimized variables.

8. A computer readable storage device having instructions to cause a computer to implement a method of optimizing a manufacturing process having source materials, intermediates, products and media storages, the method comprising:

obtaining a model describing relations between source materials, intermediates and product flows;

obtaining upper and lower bounds for each of the source materials, intermediates and product flows, for storage capacities and for combinations of multiple flows;

obtaining a set of external flows constrained to specified values including a least one source whose supply has to be consumed and at least one product whose demand has to be satisfied;

determining estimates of future values of these constrained external flows as well as estimates of the upper and lower bound of those flows;

determining a set of external flows with requirements on total production or consumption for fixed periods of time, where these requirements are subject to contracts, periodically negotiated with distribution network operators;

obtaining varying costs of raw materials and products and their predictions;

computing flows of sources, intermediates and products so that all constraints are satisfied and the profit is maximized over a time horizon and, produced/consumed amounts of media under contract since the beginning of contracting period are within a region guaranteeing satisfying the contract for any combination of trajectories of fixed external flows from the pre-specified bounds;

sending the optimal future trajectories or only the next step values of the optimized flows to sub-ordinate controllers to be enforced on the process;

receiving process values to update internal states from lower control layers or operating in open loop and replacing them by estimates from the previous step; and repeating the process of determining estimates of future values of constrained external flows and their upper and lower bounds, acquiring varying costs, computing optimal flows, sending the optimal future trajectories and receiving process values with an optimization horizon moved one time-step forward.

9. The computer readable storage device of example 8 wherein a requirement of produced/consumed amounts of media under contract since the beginning of contracting period being in a region guaranteeing satisfying the contract for any combination of trajectories of fixed external flows from the pre-specified bounds is implemented as a soft constraint adding a penalty on the square of the distance of the trajectory from the region to the optimization criterion with a suitable weighting parameter.

10. The computer readable storage device of any of examples 8-9 where an optimization cost function for computing flows contains also a penalty for deviations of produced/consumed amounts of media during the fixed contract interval from the targets specified by the contract.

11. The computer readable storage device of any of examples 8-10 where an optimization cost function for computing flows contains also a penalty on squares of time increments of flows in order to achieve smooth and well posed solution.

12. The computer readable storage device of any of examples 8-11 wherein media flow variables are allowed to change only at specific time instants on the future time horizon and are identified as part of a blocking set.

13. The computer readable storage device of any of examples 8-12 wherein the optimization horizon includes more than one contracting period.

14. The computer readable storage device of any of examples 8-13 and further comprising initializing and a periodic update of a state of the optimizer, wherein the state of the optimizer includes states of storages, state of fulfillment of current contracts, times of contract period ends, and historical values of optimized variables.

15. An optimizer to optimize a manufacturing process having source materials, intermediates, products and media storages, the optimizer comprising:

an input to obtain a model describing relations between source materials, intermediates and product flows;

an input to obtain upper and lower bounds for each of the source materials, intermediates and product flows, for storage capacities and for combinations of multiple flows;

the input further obtaining a set of external flows constrained to specified values including a least one source whose supply has to be consumed and at least one product whose demand has to be satisfied;

the processor determining estimates of future values of these constrained external flows as well as estimates of the upper and lower bound of those flows;

the input further obtaining a set of external flows with requirements on total production or consumption for fixed periods of time, where these requirements are subject to contracts, periodically negotiated with distribution network operators;

the input further obtaining varying costs of raw materials and products and their predictions;

the processor computing flows of sources, intermediates and products so that all constraints are satisfied and the profit is maximized over a time horizon and, produced/consumed amounts of media under contract since the beginning of contracting period are within a region guaranteeing satisfying the contract for any combination of trajectories of fixed external flows from the pre-specified bounds;

an output to send the optimal future trajectories or only the next step values of the optimized flows to sub-ordinate controllers to be enforced on the process;

the input receiving process values to update internal states from lower control layers or operating in open loop and replacing them by estimates from the previous step; and the processor repeating the process of determining estimates of future values of constrained external flows and their upper and lower bounds, acquiring varying costs, computing optimal flows, sending the optimal future trajectories and receiving process values with the horizon moved one time-step forward.

16. The optimizer of example 15 wherein the requirement of produced/consumed amounts of media under contract since the beginning of contracting period being in a region guaranteeing satisfying the contract for any combination of trajectories of fixed external flows from the pre-specified bounds is implemented as a soft constraint adding a penalty on the square of the distance of the trajectory from the region to the optimization criterion with a suitable weighting parameter.

17. The optimizer of any of examples 15-16 where the optimization cost function contains also a penalty for deviations of produced/consumed amounts of media during the fixed contract interval from the targets specified by the contract.

18. The optimizer of any of examples 15-17 where the optimization cost function contains also a penalty on squares of time increments of flows in order to achieve smooth and well posed solution.

19. The optimizer of any of examples 15-18 wherein media flow variables are allowed to change only at specific time instants on the future time horizon and are identified as part of a blocking set.

20. The optimizer of any of examples 15-19 wherein the optimization horizon includes more than one contracting period.

21. The optimizer of any of examples 15-20 and further comprising initializing and periodical updating a state of the optimizer, wherein the state of the optimizer includes states of storages, state of fulfillment of current contracts, times of contract period ends, and historical values of optimized variables.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer-controlled method of optimizing a manufacturing process having source materials, intermediates, products and media storages, the method comprising:
   obtaining a model describing relations between source materials, intermediates and product flows;
   setting upper and lower bounds for each of the source materials, intermediates and product flows, for storage capacities and for combinations of multiple flows;
   obtaining a first set of external flows constrained to specified values including at least one source whose supply has to be fully consumed and at least one product whose demand has to be fully satisfied;
   determining estimates of future values of the first set of external flows as well as estimates of the upper and lower bound of the first set of external flows;
   determining a second set of external flows with requirements on total production or consumption for fixed periods of time, where these the requirements are subject to contracts, periodically negotiated with distribution network operators;
   obtaining varying costs of raw materials and products;
   computing optimized flows of sources, intermediates and products so that all constraints are satisfied and a profit is maximized over a time horizon and, produced or consumed amounts of media under contract since a beginning of a contracting period are within a region guaranteeing satisfying the contract for any combination of trajectories of fixed external flows from the upper and lower bounds;
   sending the optimized flows or only the next step values of the optimized flows to sub-ordinate controllers to be enforced on the process;
   receiving process values for intermediates, product flows, and storage to update states of intermediates, product flows, and storage by replacing the states with the estimates;
   repeating the determining estimates, obtaining varying costs, computing optimized flows, sending the optimized flows and receiving process values with an optimization horizon moved one time-step forward, wherein a requirement of produced or consumed amounts of media under contract since the beginning of the contracting period being in a region guaranteeing satisfying the contract for any combination of trajectories of fixed external flows from the upper and lower bounds is implemented as a soft constraint adding a penalty on a square of a distance of a trajectory from the region to an optimization criterion with a weighting parameter, or an optimization cost function for computing flows contains also a penalty on squares of time increments of flows in order to achieve a smooth and well posed solution; and
   controlling physical flows of sources, intermediates and products in accordance with the computed optimized flows.

2. The method of claim 1 where an optimization cost function for computing flows contains also a penalty for deviations of produced amounts or consumed amounts of media during a fixed contract interval from targets specified by the contract.

3. The method of claim 1 wherein media flow variables are allowed to change only at specific time instants on the time horizon and are identified as part of a blocking set.

4. The method of claim 1 wherein the optimization horizon includes more than one contracting period.

5. The method of claim 1 and further comprising initializing a state of the optimizer, wherein the state of the optimizer includes states of storages, state of fulfillment of current contracts, times of contract period ends, and historical values of optimized variables.

6. A computer readable storage device having instructions to cause a computer to implement a method of optimizing a manufacturing process having source materials, intermediates, products and media storages, the method comprising:
   obtaining a model describing relations between source materials, intermediates and product flows;
   obtaining upper and lower bounds for each of the source materials, intermediates and product flows, for storage capacities and for combinations of multiple flows;
   obtaining a first set of external flows constrained to specified values including a least one source whose supply has to be consumed and at least one product whose demand has to be satisfied;
   determining estimates of future values of the first set of constrained external flows as well as estimates of the upper and lower bound of the first set of constrained external flows;
   determining a second set of external flows with requirements on total production or consumption for fixed periods of time, where these requirements are subject to contracts, periodically negotiated with distribution network operators;
   obtaining varying costs of raw materials and products;
   computing optimized flows of sources, intermediates and products so that all constraints are satisfied and a profit is maximized over a time horizon and, produced or consumed amounts of media under contract since a beginning of contracting period are within a region guaranteeing satisfying the contract for any combination of trajectories of fixed external flows from the re-specified upper and lower bounds;
   sending the optimized flows or only the next step values of the optimized flows to sub-ordinate controllers to be enforced on the process;
   receiving process values for intermediates, product flows, and storage to update states of intermediates, product flows, and storage by replacing the states with the estimates;
   repeating the determining estimates, obtaining varying costs, computing optimized flows, sending the optimized flow and receiving process values with an optimization horizon moved one time-step forward, wherein a requirement of produced or consumed amounts of media under contract since the beginning of the contracting period being in a region guaranteeing satisfying the contract for any combination of trajectories of fixed external flows from the upper and lower bounds is implemented as a soft constraint adding a penalty on a square of a distance of a trajectory from the region to an optimization criterion with a weighting parameter, or an optimization cost function for computing flows contains also a penalty on squares of time increments of flows in order to achieve a smooth and well posed solution; and controlling physical flows of sources, intermediates and products in accordance with the computed optimized flows.

7. The computer readable storage device of claim 6 where an optimization cost function for computing flows contains also a penalty for deviations of produced or consumed amounts of media during a fixed contract interval from targets specified by the contract.

8. The computer readable storage device of claim 6 wherein media flow variables are allowed to change only at specific time instants on the time horizon and are identified as part of a blocking set.

9. The computer readable storage device of claim 6 wherein the optimization horizon includes more than one contracting period.

10. The computer readable storage device of claim 6 and further comprising initializing and a periodic update of a state of the optimizer, wherein the state of the optimizer includes states of storages, state of fulfillment of current contracts, times of contract period ends, and historical values of optimized variables.

11. An optimizer to optimize a manufacturing process having source materials, intermediates, products and media storages, the optimizer comprising:
    an input to obtain a model describing relations between source materials, intermediates and product flows;
    an input to obtain upper and lower bounds for each of the source materials, intermediates and product flows, for storage capacities and for combinations of multiple flows;
    the input further obtaining a first set of external flows constrained to specified values including a least one source whose supply has to be consumed and at least one product whose demand has to be satisfied;
    a processor determining estimates of future values of the first set of constrained external flows as well as estimates of the upper and lower bound of the first set of constrained external flows;
    the input further obtaining a set of external flows with requirements on total production or consumption for fixed periods of time, where these requirements are subject to contracts, periodically negotiated with distribution network operators;
    the input further obtaining varying costs of raw materials and products and their predictions;
    the processor computing optimized flows of sources, intermediates and products so that all constraints are satisfied and a profit is maximized over a time horizon and, produced or consumed amounts of media under contract since the beginning of a contracting period are within a region guaranteeing satisfying the contract for any combination of trajectories of fixed external flows from the upper and lower bounds;
    sub-ordinate controllers configured to control physical flows of the sources, intermediates, and product;
    an output to send the optimized flows or only the next step values of the optimized flows to the sub-ordinate controllers to be enforced on the process;
    the input receiving process values for intermediates, product flows, and storage to update states of intermediates, product flows, and storage by replacing the states with the estimates;
    the processor repeating the determining estimates, obtaining varying costs, computing optimized flows, sending the optimized flows and receiving process values with an optimization horizon moved one time-step forward, wherein a requirement of produced or consumed amounts of media under contract since the beginning of the contracting period being in a region guaranteeing satisfying the contract for any combination of trajectories of fixed external flows from the upper and lower bounds is implemented as a soft constraint adding a penalty on a square of a distance of a trajectory from the region to an optimization criterion with a weighting parameter, or an optimization cost function for computing flows contains also a penalty on squares of time increments of flows in order to achieve a smooth and well posed solution;

the sub-ordinate controllers controlling physical flows of the sources, intermediates, and products in accordance with the optimized flows computed by the processor.

12. The optimizer of claim 11 where an optimization cost function for computing flows contains also a penalty for deviations of produced or consumed amounts of media during a fixed contract interval from targets specified by the contract.

13. The optimizer of claim 11 wherein media flow variables are allowed to change only at specific time instants on the time horizon and are identified as part of a blocking set.

14. The optimizer of claim 11 wherein the optimization horizon includes more than one contracting period, and wherein the state of the optimizer includes states of storages, state of fulfillment of current contracts, times of contract period ends, and historical values of optimized variables.

15. The method of claim 1, wherein the source materials in the model include a high grade fuel and a low grade fuel, the intermediates in the model includes a portion of the high grade fuel that is stored, and the product flows in the model include electricity supplied to a grid.

16. The method of claim 15, wherein the intermediates further include a portion of the high grade fuel that is to be burned and a portion of the high grade fuel that is to be retrieved from storage.

17. The method of claim 16, wherein the product flows further include steam produced and electricity consumed.

18. The method of claim 1, wherein controlling the physical flows includes storing high grade fuel when low grade fuel is available.

19. The optimizer of claim 11, wherein the sub-ordinate controllers control the physical flows to store high grade fuel when low grade fuel is available.

20. The optimizer of claim 6, wherein controlling the physical flows includes storing high grade fuel when low grade fuel is available.

* * * * *